United States Patent
Chun

(10) Patent No.: US 11,917,580 B2
(45) Date of Patent: Feb. 27, 2024

(54) METHOD FOR TRANSMITTING AND RECEIVING PAGING SIGNAL IN WIRELESS COMMUNICATION SYSTEM AND APPARATUS THEREFOR

(71) Applicant: LG ELECTRONICS INC., Seoul (KR)

(72) Inventor: Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 225 days.

(21) Appl. No.: 17/297,711

(22) PCT Filed: Dec. 2, 2019

(86) PCT No.: PCT/KR2019/016846
§ 371 (c)(1),
(2) Date: May 27, 2021

(87) PCT Pub. No.: WO2020/111912
PCT Pub. Date: Jun. 4, 2020

(65) Prior Publication Data
US 2022/0030548 A1    Jan. 27, 2022

(30) Foreign Application Priority Data
Nov. 30, 2018    (KR) .................. 10-2018-0152819

(51) Int. Cl.
*H04W 68/02*    (2009.01)
*H04W 60/00*    (2009.01)

(52) U.S. Cl.
CPC .......... *H04W 68/02* (2013.01); *H04W 60/005* (2013.01)

(58) Field of Classification Search
CPC .................. H04W 68/02; H04W 60/005
(Continued)

(56) References Cited

U.S. PATENT DOCUMENTS

| 2009/0215472 A1 | 8/2009 | Hsu |
| 2015/0163827 A1 | 6/2015 | Ekici |
| 2015/0350877 A1* | 12/2015 | Li .................. H04W 8/183 |
| | | 455/558 |

FOREIGN PATENT DOCUMENTS

| EP | 3742831 A1 | 11/2020 |
| EP | 4027683 A1 | 7/2022 |

(Continued)

OTHER PUBLICATIONS

Qualcomm Incorporated et al., "Avoidance of paging collisions to minimize outage of service," S2-174243, SA WG2 Meeting #122, Jun. 20, 2017, see section 2.
(Continued)

*Primary Examiner* — Joel Ajayi
(74) *Attorney, Agent, or Firm* — BRYAN CAVE LEIGHTON PAISNER LLP

(57) ABSTRACT

A method of receiving, by a user equipment (UE), a paging signal in a wireless communication system is disclosed. More specifically, the UE performs a registration to a plurality of networks, obtains a plurality of monitoring time points that has to check whether a paging message is received from each of the plurality of networks, when at least some of the plurality of monitoring time points overlap, transmits, to a first network, a change request of a first monitoring time point that has to check whether a first paging message is received from the first network of the plurality of networks, receives, from the first network, configuration information related to the request, and updates the first monitoring time point based on the configuration information.

6 Claims, 14 Drawing Sheets

(58) Field of Classification Search
USPC .................................................... 455/435.1
See application file for complete search history.

(56) References Cited

FOREIGN PATENT DOCUMENTS

| KR | 1020170141095 | 12/2017 |
| KR | 1020180016250 | 2/2018 |
| WO | 2018161244 A1 | 9/2018 |
| WO | 2020124057 A1 | 6/2020 |

OTHER PUBLICATIONS

Qualcomm Incorporated, Oppo, China Unicom, Vivo, "Avoidance of paging collisions to minimize outage of services", SA WG2 Meeting #122, Jun. 26-30, 2017, S2-174243, XP051303098.
Intel, "Solution for Paging Reception with PO collision avoidance", SA WG2 Meeting #S2-136, Nov. 18-22, 2019, S2-1911097, XP051821205.

* cited by examiner

[FIG. 1]
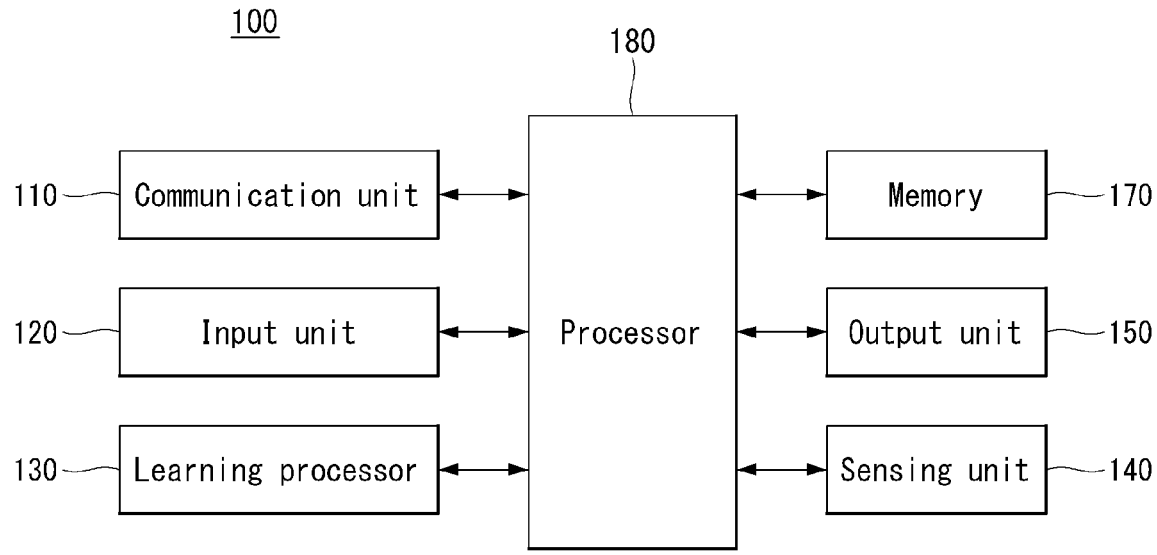
[FIG. 2]
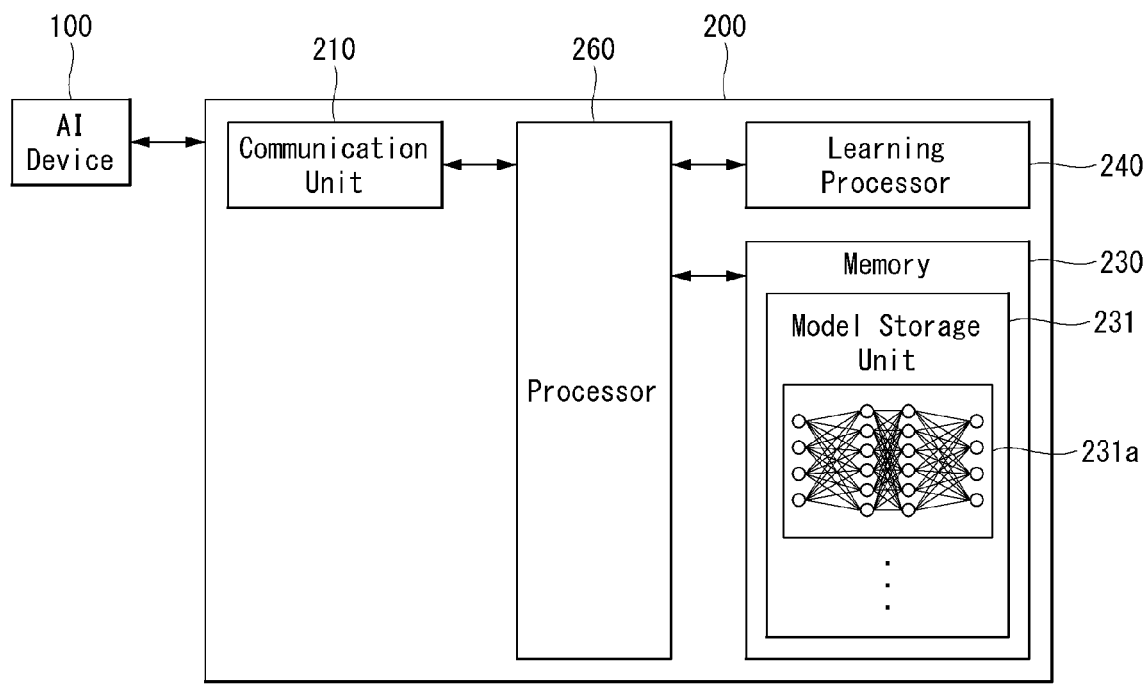

[FIG.3]
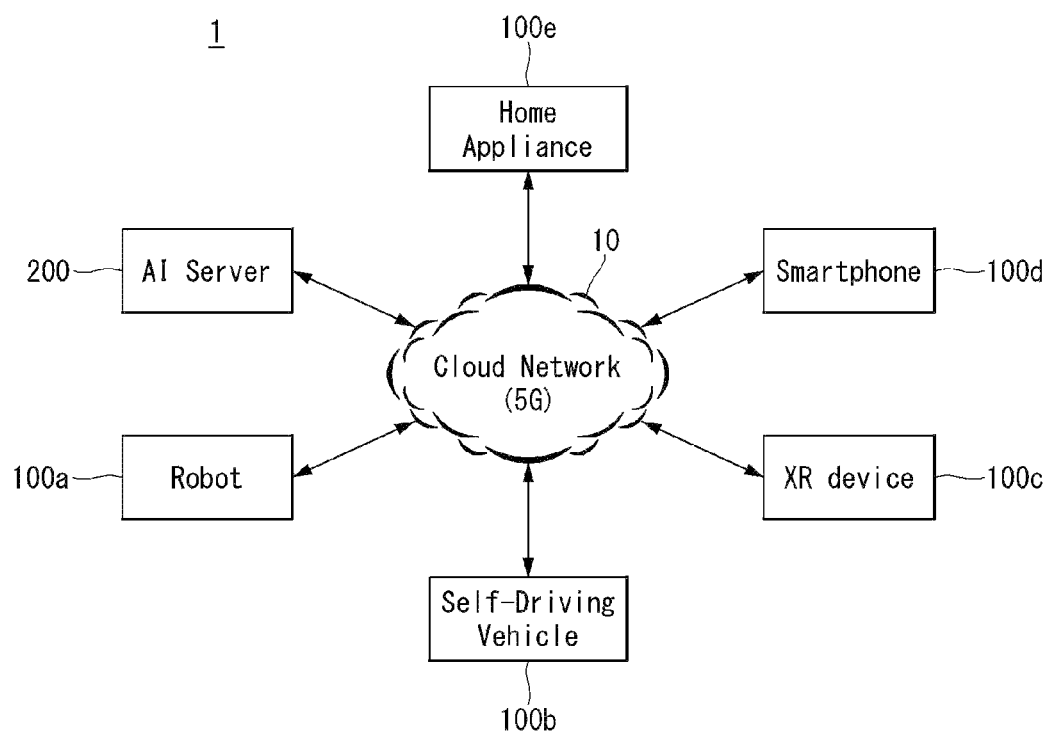

[FIG. 4]
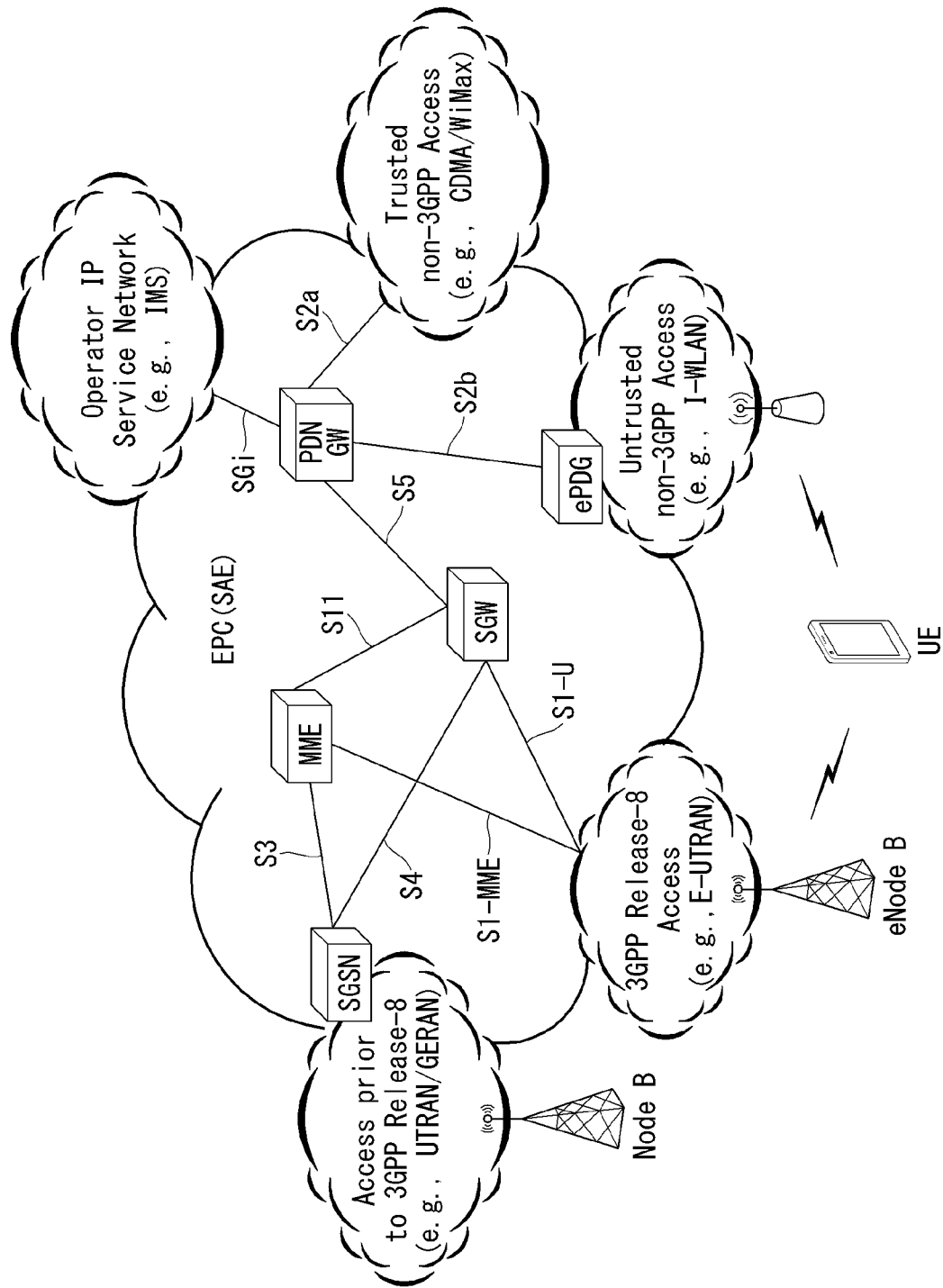

[FIG. 5]
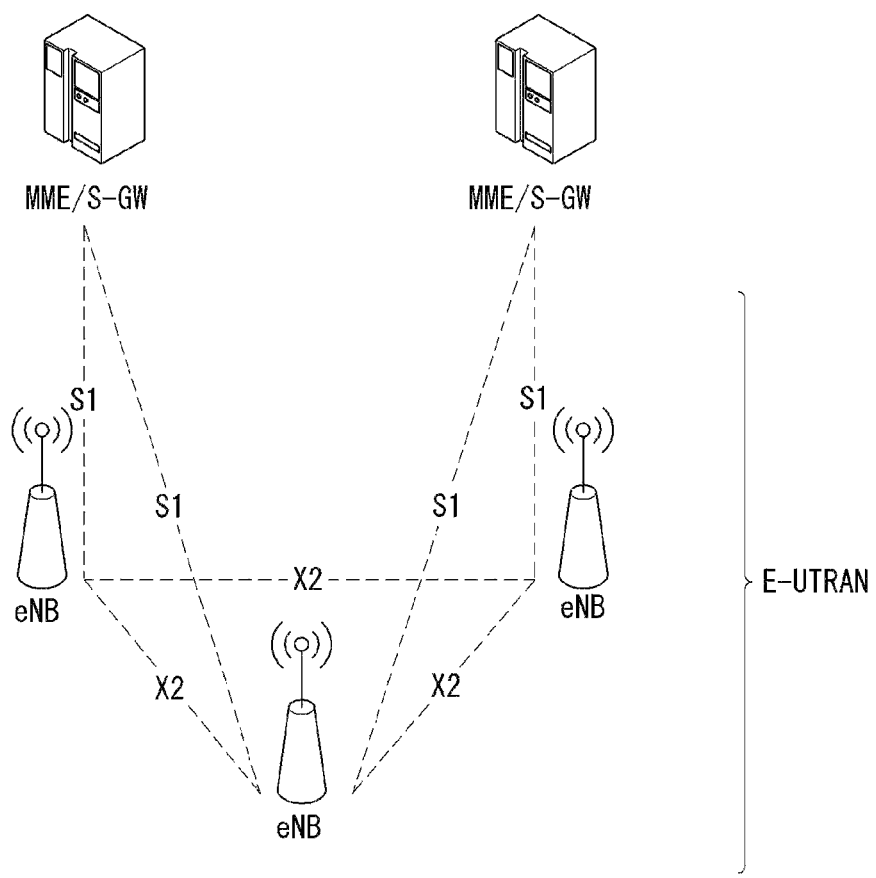

[FIG. 6]
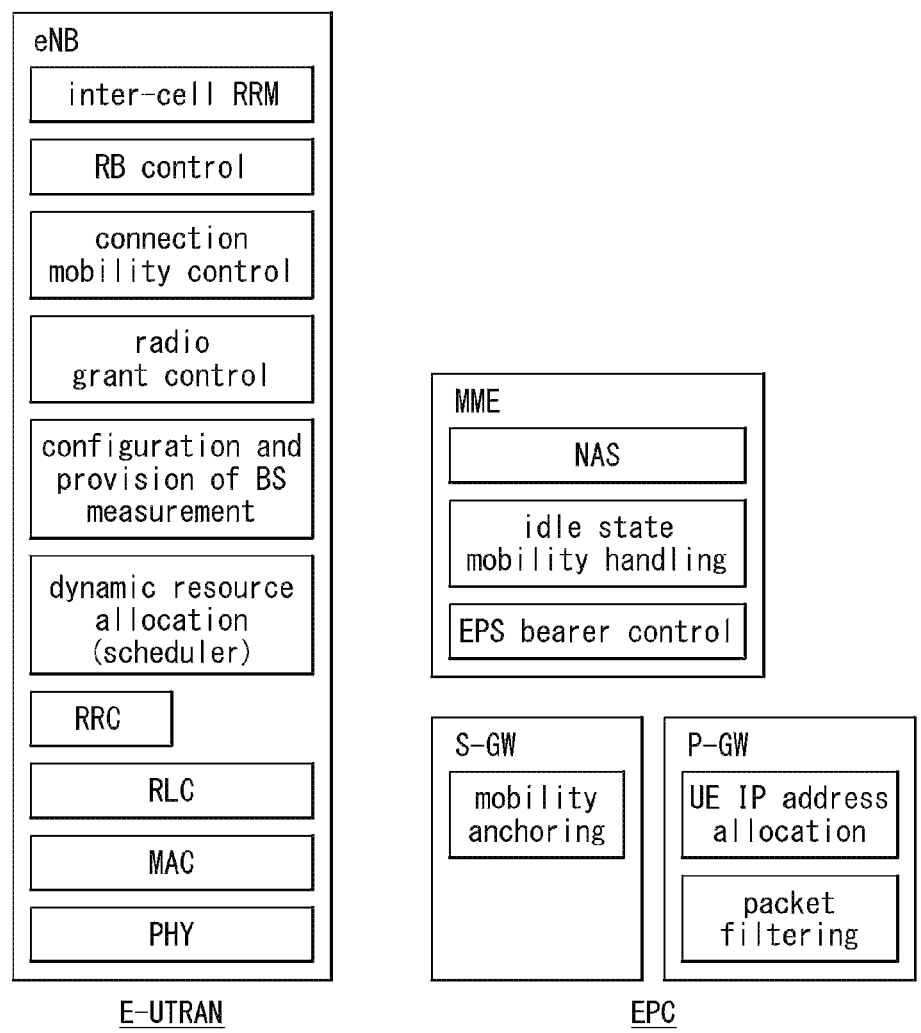

[FIG. 7]
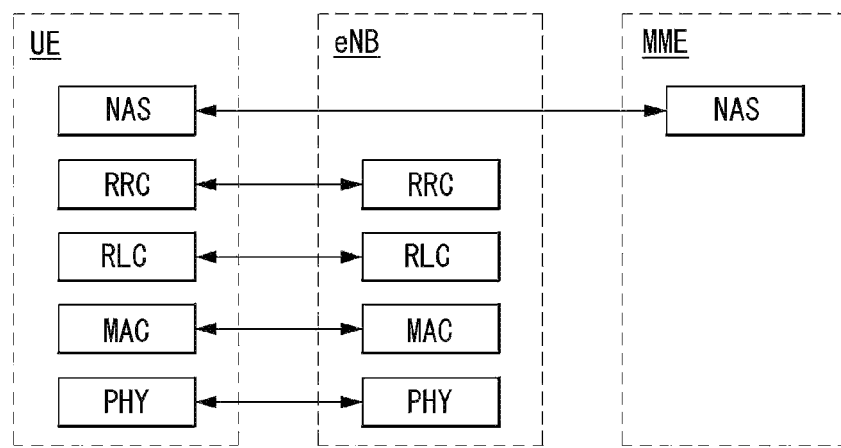
[FIG. 8]
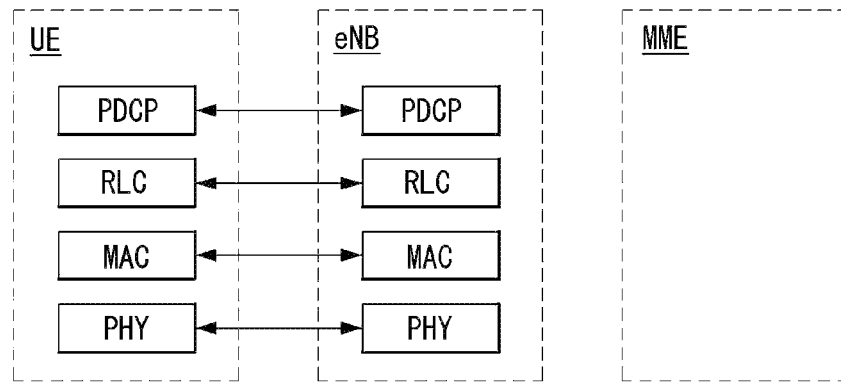

[FIG. 9]
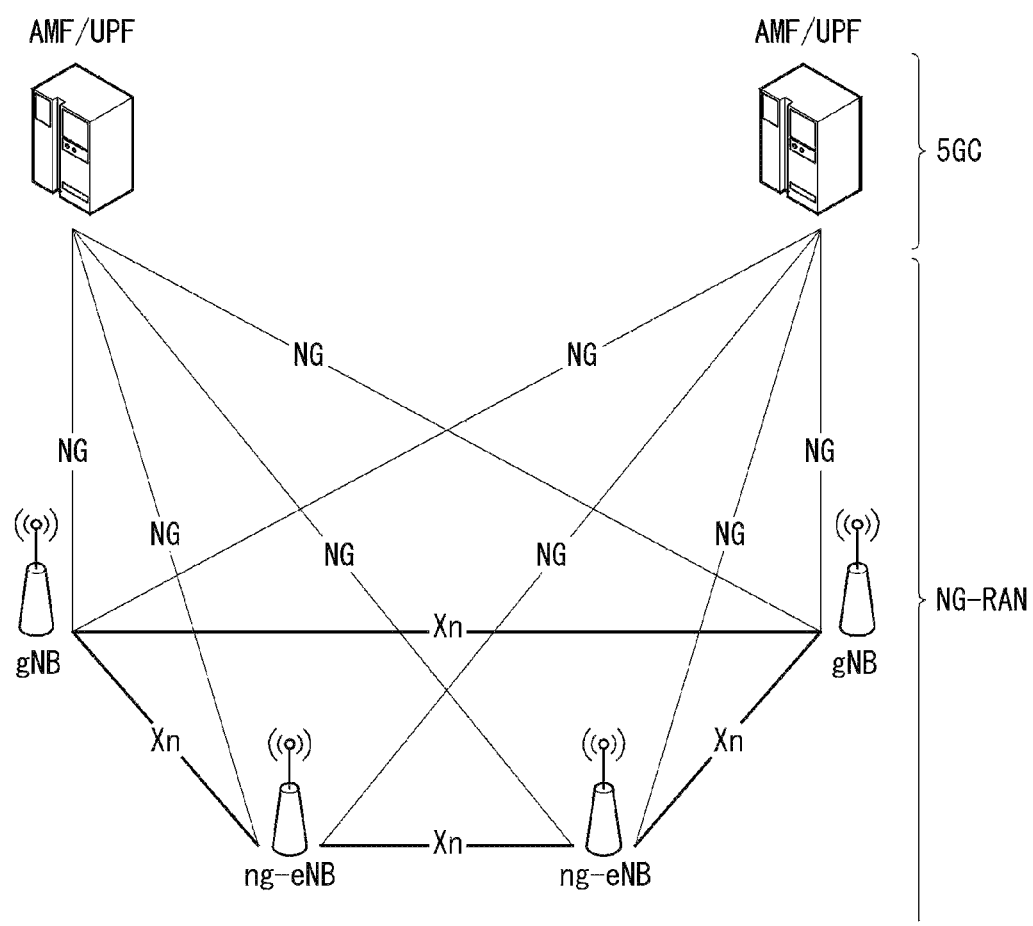

[FIG. 10]
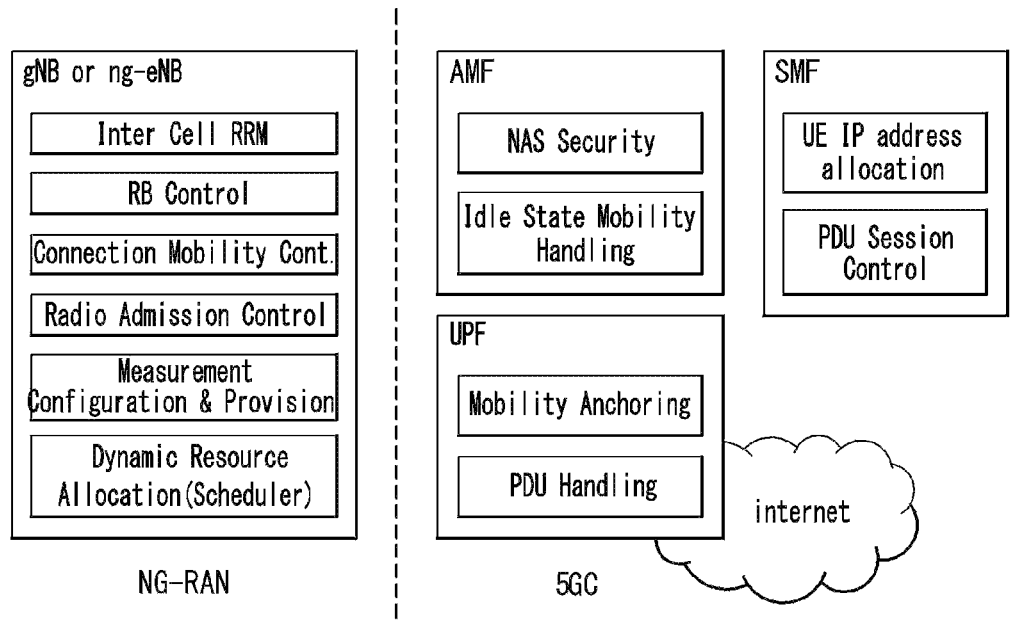
[FIG. 11]
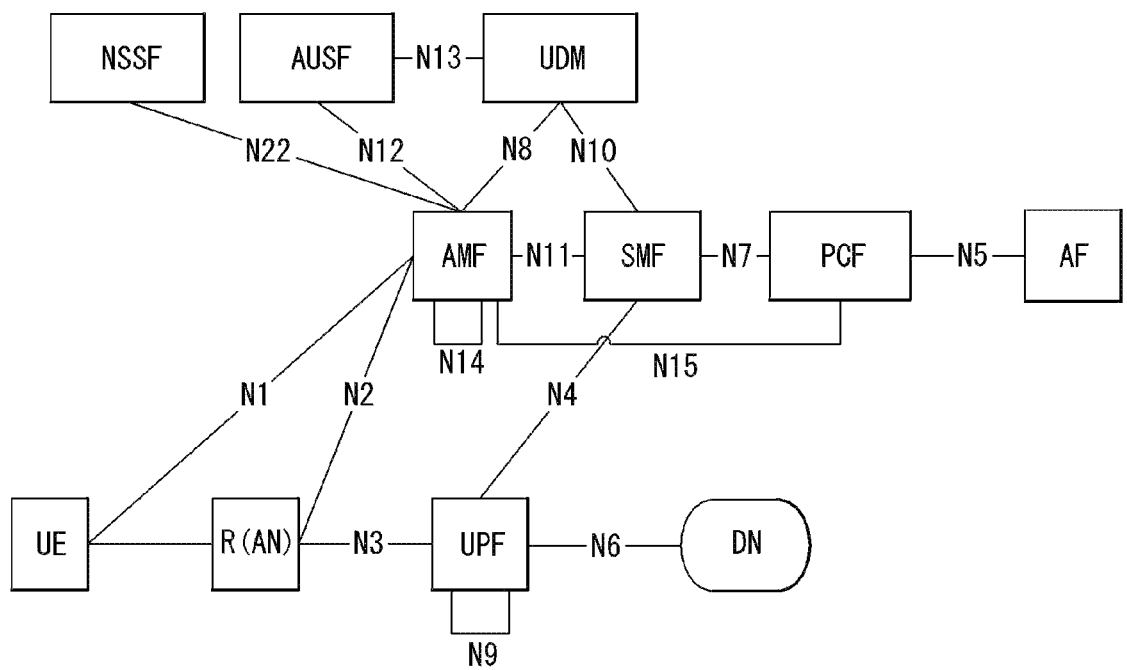

[FIG. 12]
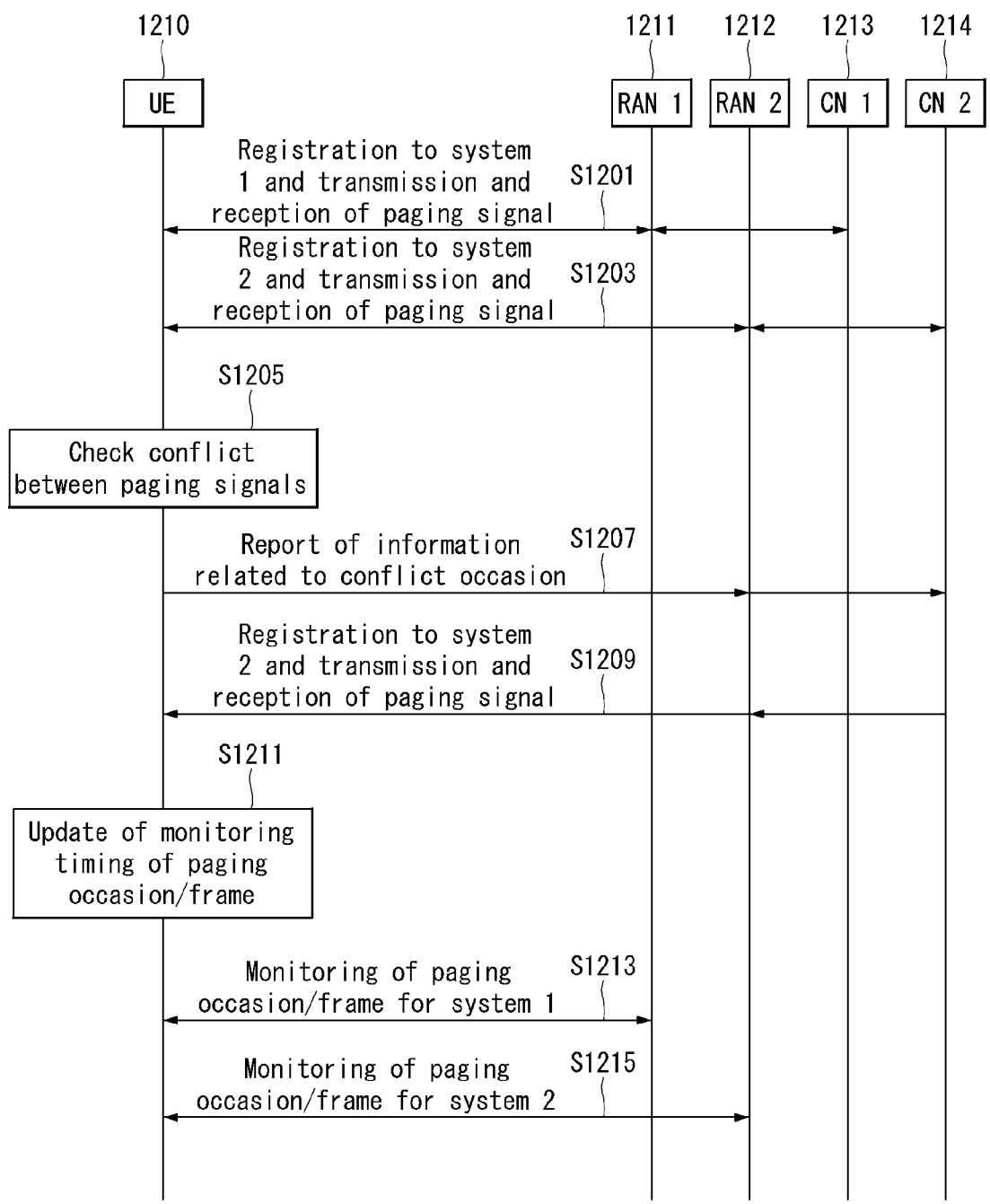

[FIG. 13]
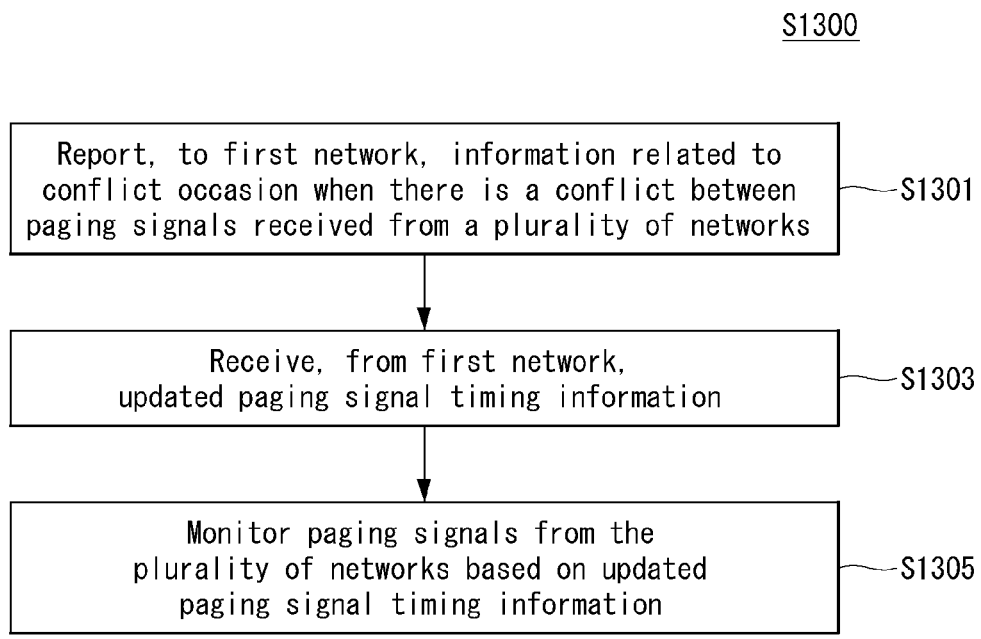
[FIG. 14]
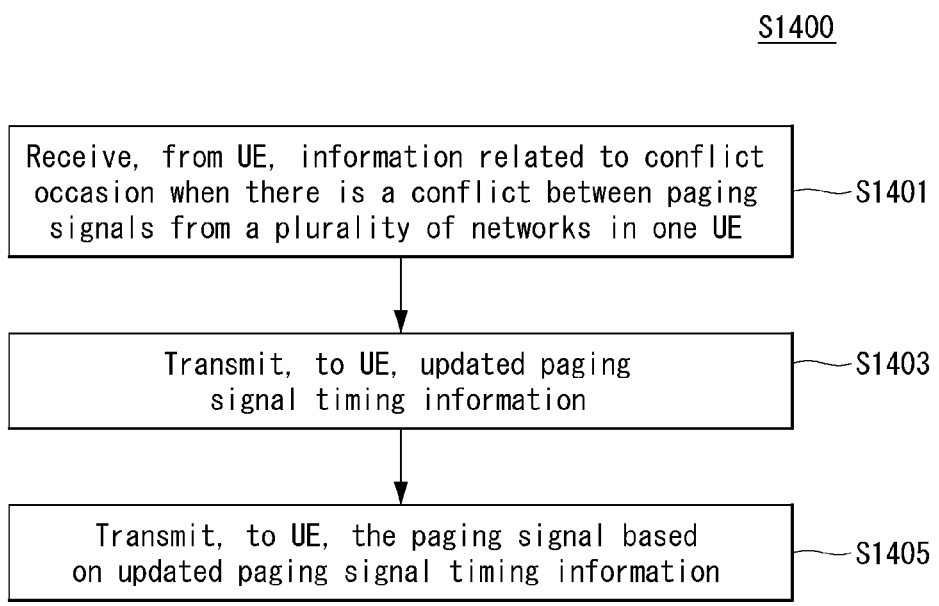

[FIG. 15]
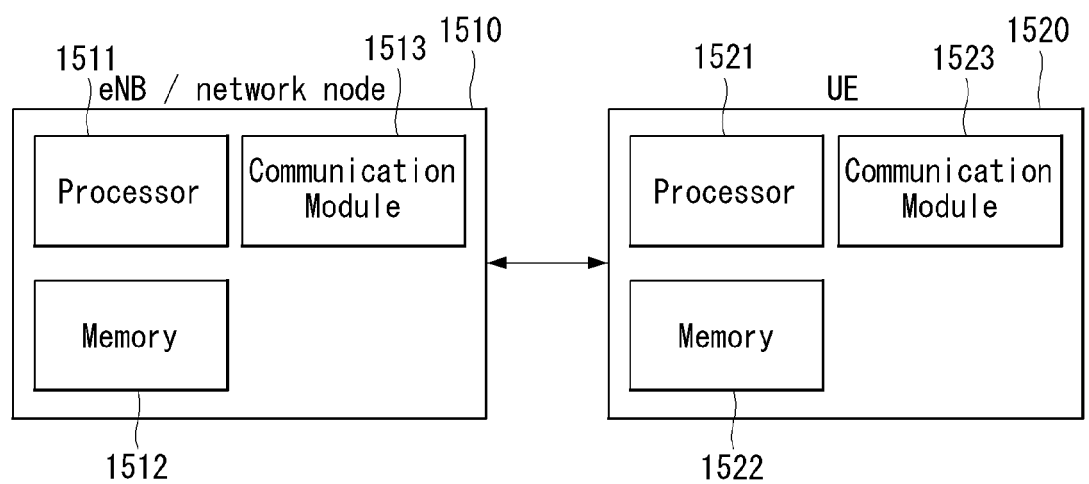

[FIG. 16]
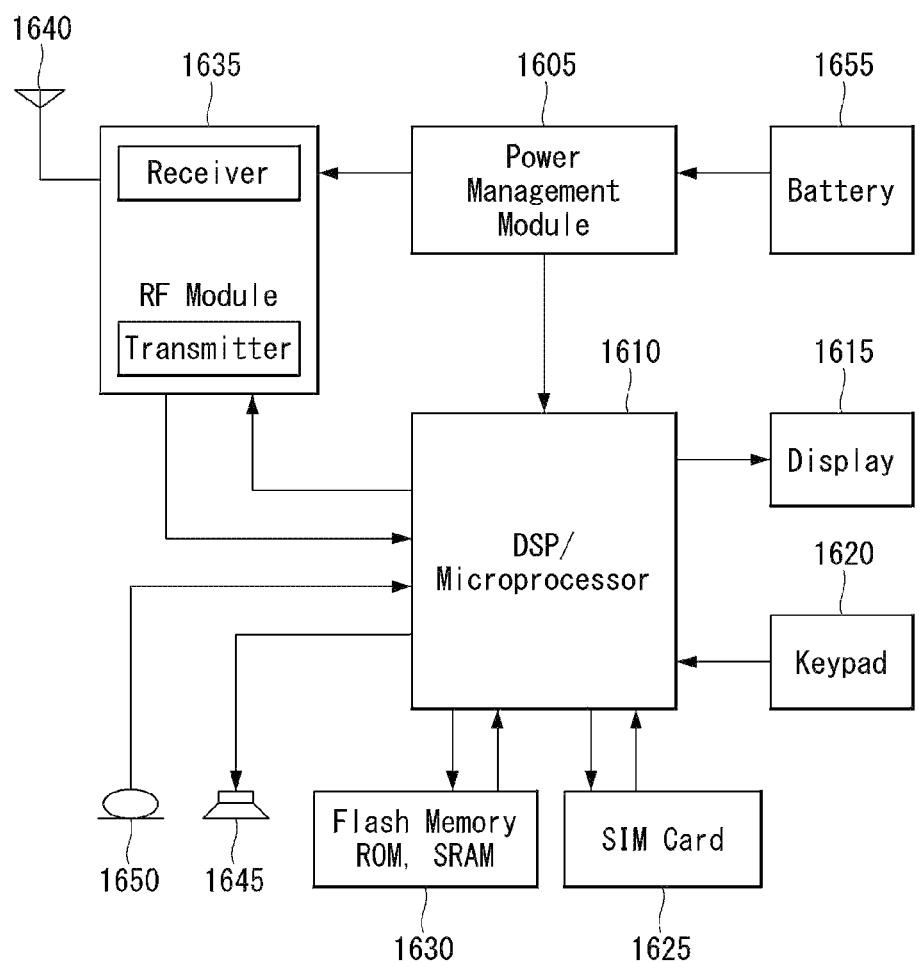

[FIG. 17]
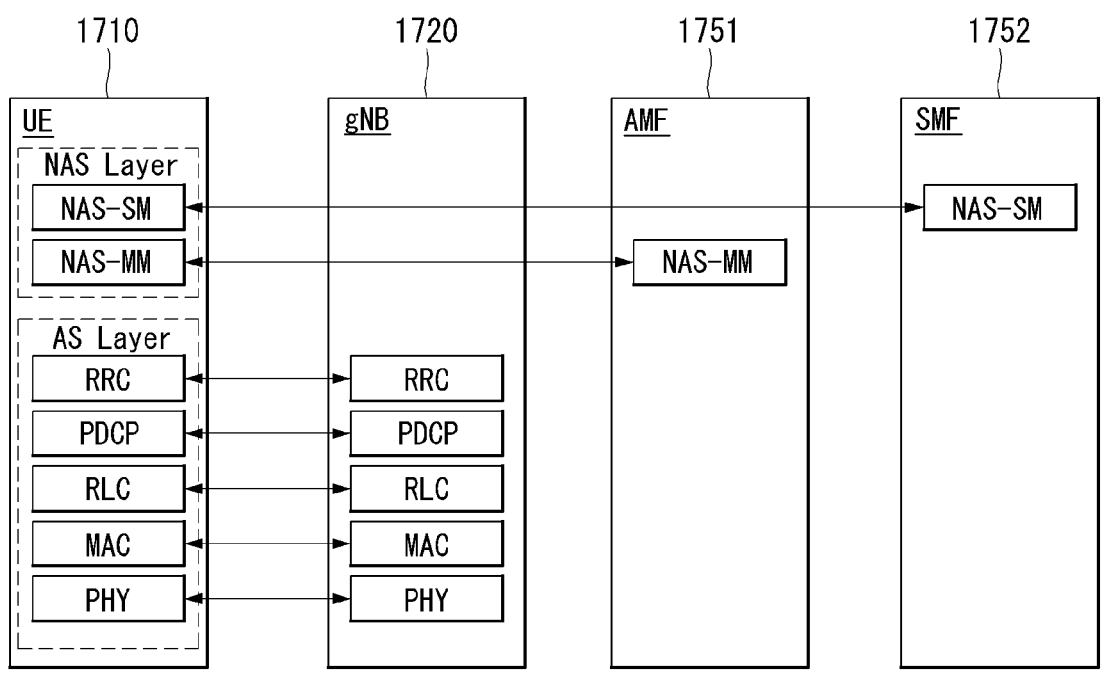

[FIG. 18]

| 8 | 7 | 6 | 5 | 4 | 3 | 2 | 1 | |
|---|---|---|---|---|---|---|---|---|
| | EPS update type IEI | | | "Active" flag | EPS update type Value | | | Octet 1 |

[FIG. 19]

```
EPS update type value (octet 1, bit 1 to 3)

Bits 3 2 1
0 0 0    TA updating
0 0 1    combined TA/LA updating
0 1 0    combined TA/LA updating with IMSI attach
0 1 1    periodic updating
1 0 0    unused; shall be interpreted as "TA updating", if received by the network.
1 0 1    unused; shall be interpreted as "TA updating", if received by the network.
1 1 1    For paging problem indication All other values are reserved "Active" flag (octet 1, bit 4)

Bit 4
0    No bearer establishment requested
1    Bearer establishment requested
```

METHOD FOR TRANSMITTING AND RECEIVING PAGING SIGNAL IN WIRELESS COMMUNICATION SYSTEM AND APPARATUS THEREFOR

This application is the National Stage filing under 35 U.S.C. 371 of International Application No. PCT/KR2019/016846 filed on Dec. 2, 2019, which claims priority to Korean Patent Application No. 10-2018-0152819 filed on Nov. 30, 2018, the contents of which are hereby incorporated by reference herein in their entirety.

TECHNICAL FIELD

The present disclosure relates to a wireless communication system, and more particularly to a method for transmitting and receiving a paging signal between a plurality of networks and a user equipment and a device therefor.

BACKGROUND ART

In a wireless communication system, mobile communication systems have been developed to provide a voice service while ensuring the activity of a user. However, the area of the mobile communication systems has extended to a data service in addition to a voice. Due to the current explosive increase in traffic, there is a shortage of resources, and thus users demand a higher speed service. Accordingly, there is a need for a more advanced mobile communication system.

Requirements for next-generation mobile communication systems need to able to support the accommodation of explosive data traffic, a dramatic increase in data rate per user terminal, the accommodation of a significant increase in the number of connected devices, very low end-to-end latency, and high-energy efficiency. To this end, studies have been conducted on various technologies such as dual connectivity, massive multiple input multiple output (MIMO), in-band full duplex, non-orthogonal multiple access (NOMA), super wideband support, and device networking.

DISCLOSURE

Technical Problem

In a related art, when one UE receives paging signals from a plurality of operator networks at the same time (overlap of at least a part in terms of time), a conflict occurs between the paging signals. Hence, there is a problem in that the networks cannot provide sufficient services to the UE for a fixed time.

In order to solve the above-described and other problems, the present disclosure provides a method for a UE to efficiently receive a plurality of paging signals in a situation of a conflict between the paging signals simultaneously received from a plurality of networks in a wireless communication system, and a device therefor.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect, there is provided a method of receiving, by a user equipment (UE), a paging signal in a wireless communication system, the method comprising performing a registration to a plurality of networks; obtaining a plurality of monitoring time points that has to check whether a paging message is received from each of the plurality of networks; when at least some of the plurality of monitoring time points overlap, transmitting, to a first network, a change request of a first monitoring time point that has to check whether a first paging message is received from the first network of the plurality of networks; receiving, from the first network, configuration information related to the request; and updating the first monitoring time point based on the configuration information.

The configuration information includes information related to the updated first monitoring time point from the first network.

The configuration information includes an identity of the UE, and the identity includes IMSI (p-IMSI), new TMSI, or new GUTI for paging.

The method further comprises determining a network supporting an update of the monitoring time point among the plurality of networks. The requesting comprises, when the first network is determined as the network supporting the update of the monitoring time point, requesting the first network to update the first monitoring time point.

The requesting comprises requesting the first network to update the first monitoring time point, when receiving, from the first network, information that the first network supports the update of the monitoring time point.

In another aspect, there is provided a user equipment (UE) receiving a paging signal from a plurality of networks in a wireless communication system, the UE comprising a radio frequency (RF) module configured to transmit and receive a radio signal; at least one processor functionally connected to the RF module; and at least one computer memory operationally connected to the at least one processor, wherein the at least one computer memory is configured to store, upon execution, instructions that allow the at least one processor to perform a registration to the plurality of networks; obtain a plurality of monitoring time points that has to check whether a paging message is received from each of the plurality of networks; when at least some of the plurality of monitoring time points overlap, transmit, to a first network, a change request of a first monitoring time point that has to check whether a first paging message is received from the first network of the plurality of networks; receive, from the first network, configuration information related to the request; and update the first monitoring time point based on the configuration information.

The configuration information includes information related to the updated first monitoring time point from the first network.

The configuration information includes an identity of the UE, and the identity includes IMSI, new TMSI, or new GUTI for paging.

The at least one processor is configured to determine a network supporting an update of the monitoring time point among the plurality of networks. The at least one processor is further configured to, when the first network is determined as the network supporting the update of the monitoring time point, request the first network to update the first monitoring time point.

The at least one processor is further configured to request the first network to update the first monitoring time point, when receiving, from the first network, information that the first network supports the update of the monitoring time point.

In another aspect, there is provided a method of transmitting, by a first network, a paging signal in a wireless communication system, the method comprising performing a registration for a user equipment (UE); when there is an overlap between at least some of a plurality of monitoring time points that has to check whether a paging message is received from each of a plurality of networks including the first network, receiving, from the UE, a change request of a first monitoring time point that has to check whether a first paging message of the first network is received; transmitting, to the UE, configuration information related to the request; and transmitting the first paging message to the UE based on the configuration information.

The configuration information includes information related to the updated first monitoring time point from the first network.

The configuration information includes an identity of the UE, and the identity includes IMSI (p-IMSI), new TMSI, or new GUTI for paging.

Performing the registration for the UE comprises, when the first network supports an update of the monitoring time, transmitting, to the UE, information that the first network supports the update of the first monitoring time point.

Performing the registration for the UE comprises receiving, from the UE, information related to a second monitoring time point of a second network. The configuration information includes information related to the first monitoring time point generated based on the second monitoring time point.

In another aspect, there is provided a first network transmitting a paging signal to a user equipment (UE) in a wireless communication system, the first network comprising a radio frequency (RF) module configured to transmit and receive a radio signal; at least one processor functionally connected to the RF module; and at least one computer memory operationally connected to the at least one processor, wherein the at least one computer memory is configured to store, upon execution, instructions that allow the at least one processor to perform a registration for the UE; when there is an overlap between at least some of a plurality of monitoring time points that has to check whether a paging message is received from each of a plurality of networks including the first network, receive, from the UE, a change request of a first monitoring time point that has to check whether a first paging message of the first network is received; transmit, to the UE, configuration information related to the request; and transmit the first paging message to the UE based on the configuration information.

The configuration information includes information related to the updated first monitoring time point from the first network.

The configuration information includes an identity of the UE, and the identity includes IMSI (p-IMSI), new TMSI, or new GUTI for paging.

The at least one processor is configured to, when the first network supports an update of the monitoring time, transmit, to the UE, information that the first network supports the update of the first monitoring time point.

The at least one processor is further configured to receive, from the UE, information related to a second monitoring time point of a second network. The configuration information includes information related to the first monitoring time point generated based on the second monitoring time point.

Advantageous Effects

The present disclosure can prevent a conflict between paging signals received from a plurality of core networks connected to a UE.

The present disclosure can also improve throughput between core networks and a UE by preventing a conflict between a plurality of paging signals received by the UE.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates an AI device 100 according to an embodiment of the present disclosure.

FIG. 2 illustrates an AI server 200 according to an embodiment of the present disclosure.

FIG. 3 illustrates an AI system 1 according to an embodiment of the present disclosure.

FIG. 4 illustrates various reference points.

FIG. 5 illustrates an example of a network structure of an evolved universal terrestrial radio access network (E-UTRAN) to which the present disclosure is applicable.

FIG. 6 illustrates an example of a general architecture of E-UTRAN and EPC.

FIG. 7 illustrates an example of a structure of a radio interface protocol in a control plane between a LTE and eNB.

FIG. 8 illustrates an example of a structure of a radio interface protocol in a user plane between a UE and eNB.

FIG. 9 illustrates a general architecture of NR-RAN.

FIG. 10 illustrates an example of general functional split between NG-RAN and 5GC.

FIG. 11 illustrates an example of a general architecture of 5G.

FIG. 12 illustrates a flow of signal transmission and reception between a plurality of networks and a UE according to an embodiment of the present disclosure.

FIG. 13 is a flow chart illustrating a method for a UE to receive paging signals from networks in accordance with an embodiment of the present disclosure.

FIG. 14 is a flow chart illustrating a method for networks to transmit paging signals to a UE in accordance with an embodiment of the present disclosure.

FIG. 15 illustrates a configuration block diagram of a communication device according to an embodiment of the present disclosure.

FIG. 16 illustrates a configuration block diagram of a communication device according to an embodiment of the present disclosure.

FIG. 17 illustrates an example of a structure of a radio interface protocol in a control plane between a UE and eNodeB.

FIG. 18 illustrates an EPS update type information element.

FIG. 19 illustrates exemplary EPS update type values.

MODE FOR INVENTION

Reference will now be made in detail to embodiments of the disclosure, examples of which are illustrated in the accompanying drawings. A detailed description to be disclosed below together with the accompanying drawing is to describe exemplary implementations of the present disclosure and not to describe a unique implementation for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

Description of Terms in the Present Disclosure

In the present disclosure, a base station (BS) refers to a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced by terms such as a fixed station, Node B, evolved-NodeB (eNB), a base transceiver system (BTS), an access point (AP), and gNB (general NB). Further, a 'terminal' may be fixed or movable and may be replaced by terms such as user equipment (UE), a mobile station (MS), a user terminal (UT), a mobile subscriber station (MSS), a subscriber station (SS), an advanced mobile station (AMS), a wireless terminal (WT), a machine type communication (MTC) device, a machine-to-machine (M2M) device, and a device-to-device (D2D) device.

In the present disclosure, downlink (DL) refers to communication from the base station to the terminal, and uplink (UL) refers to communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and non-orthogonal multiple access (NOMA). The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, and E-UTRA (evolved UTRA). The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in downlink and adopts the SC-FDMA in uplink. LTE-advanced (A) is an evolution of the 3GPP LTE.

Embodiments of the present disclosure can be supported by standard documents disclosed in at least one of the IEEE 802, 3GPP, and 3GPP2 specifications regarding wireless access systems. In other words, in embodiments of the present disclosure, those steps or parts omitted for the purpose of clearly describing technical principles of the present disclosure can be supported by the standard documents. All the terms disclosed in the present disclosure can also be explained by the standard documents.

3GPP LTE/LTE-A is primarily described for clear description, but technical features of the present disclosure are not limited thereto.

Terms used in the present disclosure are defined as follows.

IP Multimedia Subsystem or IP Multimedia Core Network Subsystem (IMS): an architectural framework for providing standardization for delivering voice or other multimedia services on internet protocol (IP).

Universal Mobile Telecommunication System (UMTS): the 3rd generation mobile communication technology based on global system for mobile communication (GSM) developed by the 3GPP.

Evolved Packet System (EPS): a network system consisting of an evolved packet core (EPC), that is an internet protocol (IP) based packet switched core network, and an access network such as LTE and UTRAN. The EPS is a network of an evolved version of UMTS.

NodeB: a base station of a UMTS network. It is installed outdoor, and its coverage has a scale of a macro cell.

eNodeB: a base station of an EPS network. It is installed outdoor, and its coverage has a scale of a macro cell.

Home NodeB: it is installed indoors as a base station of the UMTS network, and its coverage has a scale of a macro cell.

Home eNodeB: it is installed indoors as a base station of the EPS network, and its coverage has a scale of a macro cell.

User Equipment (UE): the UE may refer to terms such as a terminal, a mobile equipment (ME), and a mobile station (MS). The UE can be a portable device such as a notebook computer, a cellular phone, a personal digital assistant (PDA), a smart phone, and a multimedia device, or a non-portable device such as a personal computer (PC) and a vehicle-mounted device. The term of UE may refer to an MTC UE in the description related to MTC.

Machine Type Communication (MTC): communication performed by machines without human intervention. It may be called Machine-to-Machine (M2M) communication.

MTC terminal (MTC UE or MTC device or MTC apparatus): a terminal (e.g., a vending machine, meter, etc.) having a communication function (e.g., communication with an MTC server over PLMN) over a mobile communication network and performing a MTC function.

Radio Access Network (RAN): a unit including a Node B and a radio network controller (RNC) and eNodeB controlling the Node B in the 3GPP network. The RAN exists at a UE end and provides a connection to a core network.

Home Location Register (HLR)/Home Subscriber Server (HSS): a database containing subscriber information within the 3GPP network. The HSS can perform functions such as configuration storage, identity management, user state storage, etc.

Public Land Mobile Network (PLMN): a network configured for the purpose of providing mobile communication services to individuals. The PLMN can be configured for each operator.

Non-Access Stratum (NAS): a functional layer for exchanging signalling and a traffic message between a UE and a core network at the UMTS and EPS protocol stacks. The NAS mainly functions to support mobility of the UE and support a session management procedure for establishing and maintaining an IP connection between the UE and PDN GW.

Service Capability Exposure Function (SCEF): an entity within the 3GPP architecture for service capability exposure that provides a means to safely expose the services and capabilities provided by 3GPP network interfaces.

Mobility Management Entity (MME): a network node in the EPS network which performs mobility management and session management functions.

Packet Data Network Gateway (PDN-GW): a network node in the EPS network which performs UE IP address allocation, packet screening and filtering, and charging data collection functions.

Serving GW (Serving Gateway): a network node in the EPS network which performs functions such as mobility anchor, packet routing, idle mode packet buffering, and triggering of paging for the UE of MME.

Policy and Charging Rule Function (PCRF): a node in the EPS network which performs policy decision to dynamically apply differentiated QoS and billing policies per each service flow.

Open Mobile Alliance Device Management (OMA DM): A protocol designed to manage mobile devices, such as mobile phones, PDAs, and portable computers, which performs functions such as device configuration, firmware upgrade, and error report Operation Administration and Maintenance (OAM): A network management function group which provides network fault indication, performance information, and data and diagnostic functions.

Packet Data Network (PDN): a network in which a server (e.g., MMS server, WAP server, etc.) supporting a specific service is located.

PDN connection: a connection from the UE to the PDN, i.e., the association (connection) between the UE represented by the IP address and the PDN represented by the APN.

EPS Mobility Management (EMM): a sublayer of the NAS layer, where the EMM may be in an "EMM-Registered" or "EMM-Deregistered" state depending on whether the UE is network attached or detached.

EMM Connection Management (ECM) connection: A signaling connection for the exchange of NAS messages, established between the UE and the MME. An ECM connection is a logical connection consisting of an RRC connection between the UE and an eNB and S1 signaling connection between the eNB and the MME. When the ECM connection is established/terminated, the RRC and S1 signaling connections are established/terminated as well. To the UE, the established ECM connection means having an RRC connection established with the eNB, and to the MME, it means having an S1 signaling connection established with the eNB. Depending on whether the NAS signaling connection, i.e., the ECM connection is established, the ECM may have an "ECM-Connected" or "ECM-Idle" state.

Access-Stratum (AS): It includes a protocol stack between the UE and the radio (or access) network and is responsible for transmitting data and network control signals.

NAS configuration Management Object (MO): A management object (MO) used to configure the UE with parameters related to NAS functionality.

Packet Data Network (PDN): A network in which a server (e.g., multimedia messaging service (MMS) server, wireless application protocol (WAP) server, etc.) supporting a specific service is located.

PDN connection: a logical connection between the UE and the PDN, represented by one IP address (one IPv4 address and/or one IPv6 prefix).

Access Point Name (APN): a string that refers to or identifies a PDN. In order to access the requested service or network, it goes through a specific P-GW, which means a predefined name (string) in the network so that the P-GW can be found. (e.g., internet.mnc012.mcc345.gprs)

Access Network Discovery and Selection Function (ANDSF): it is a network entity and provides policies that allow the UE to discover and select an available access on a per operator basis.

EPC path (or infrastructure data path): a user plane communication path through EPC.

E-UTRAN Radio Access Bearer (E-RAB): it refers to the concatenation of a S1 bearer and a corresponding data radio bearer. If there is an E-RAB, there is an one-to-one mapping between the E-RAB and the EPS bearer of the NAS.

GPRS Tunneling Protocol (GTP): a group of IP-based communications protocols used to carry general packet radio service (GPRS) within GSM, UMTS and LTE networks. Within the 3GPP architecture, GTP and proxy mobile IPv6-based interfaces are specified on various interface points. GTP can be decomposed into several protocols (e.g., GTP-C, GTP-U and GTP'). GTP-C is used within a GPRS core network for signalling between gateway GPRS support nodes (GGSN) and serving GPRS support nodes (SGSN). GTP-C allows the SGSN to activate a session (e.g., PDN context activation), deactivate the same session, adjust the quality of service parameters, or renew a session for a subscriber, that has just operated from another SGSN, for the user. GTP-U is used to carry user data within the GPRS core network and between the radio access network and the core network.

Cell as a radio resource: the 3GPP LTE/LTE-A system has used a concept of a cell to manage radio resources, and a cell related to the radio resource is distinguished from a cell of a geographic area. The "cell" related to the radio resource is defined as a combination of downlink (DL) resources and uplink (UL) resources, i.e., a combination of DL carriers and UL carriers. The cell may be configured with DL resource only or a combination of DL resources and UL resources. If carrier aggregation is supported, a linkage between a carrier frequency of the DL resource and a carrier frequency of the UL resource may be indicated by system information. Here, the carrier frequency refers to a center frequency of each cell or carrier. In particular, a cell operating on a primary frequency is called a primary cell or Pcell, and a cell operating on a secondary frequency is called a secondary cell or Scell. The Scell refers to a cell that can be configured after radio resource control (RRC) connection establishment is achieved and can be used for providing additional radio resources. Depending on capabilities of the UE, the Scell together with the Pcell can form a set of serving cells for the UE. For the UE that is in a RRC_CONNECTED state but is not configured with carrier aggregation, or does not support carrier aggregation, there is only one serving cell configured with only the Pcell. The "cell" of the geographic area can be understood as a coverage in which a node can provide services using a carrier, and the "cell" of the radio resource is related to a bandwidth (BW) that is a frequency range configured by the carrier. Since a downlink coverage that is a range within which the node can transmit a valid signal and an uplink coverage that is a range within which the node can receive the valid signal from the UE depend on the carrier carrying the corresponding signal, the coverage of the node is associated with the coverage of the "cell" of the radio resource the node uses. Thus, the term "cell" may be used to sometimes denote the coverage of the service by the node, sometimes denote the radio resource, and sometimes denote a range that a signal using the radio resources can reach with a valid strength.

The EPC is a key element of system architecture evolution (SAE) to improve the performance of 3GPP technologies. The SAE corresponds to a research project to determine a network structure supporting mobility between various kinds of networks. The SAE aims to provide an optimized packet-based system, for example, supporting various radio access technologies on an IP basis and providing more improved data transfer capability.

More specifically, the EPC is a core network of an IP mobile communication system for the 3GPP LTE system and can support packet-based real-time and non-real time services. In the existing mobile communication system (i.e., in the 2nd or 3rd mobile communication system), functions of the core network have been implemented through two separate sub-domains including a circuit-switched (CS) sub-domain for voice and a packet-switched (PS) sub-domain for data. However, in the 3GPP LTE system that is an evolution of the 3rd mobile communication system, the CS and PS sub-domains have been unified into a single IP domain. That is, in the 3GPP LTE system, a connection between UEs having IP capabilities can be configured via an IP-based base station (e.g., evolved Node B (eNodeB)), an EPC, and an application domain (e.g., IP multimedia subsystem (IMS)). In other words, the EPC is an essential architecture to implement end-to-end IP services.

The EPC may include various components, and FIG. 1 illustrates some of the EPC components, including a serving gateway (SGW), a packet data network gateway (PDN GW), a mobility management entity (MME), a SGSN (serving GPRS (general packet radio service) supporting node), and an enhanced packet data gateway (ePDG).

The SGW (or S-GW) operates as a boundary point between a radio access network (RAN) and a core network, and is an element that functions to maintain a data path between the eNB and the PDN GW. Further, if the UE moves across areas served by the eNB, the SGW serves as a local mobility anchor point. That is, packets can be routed through the SGW for mobility within the E-UTRAN (evolved-universal mobile telecommunications system (UMTS) terrestrial radio access network defined in 3GPP Release-8 or later). The SGW may also serve as an anchor point for mobility with other 3GPP networks (RAN defined before 3GPP Release-8, for example, UTRAN or GERAN (global system for mobile communication (GSM)/enhanced data rates for global evolution (EDGE) radio access network).

The PDN GW (or P-GW) corresponds to a termination point of a data interface to a packet data network. The PDN GW can support policy enforcement features, packet filtering, charging support, and the like. In addition, the PDN GW can serve as an anchor point for mobility management between the 3GPP network and a non-3GPP network (e.g., untrusted networks such as an interworking wireless local area network (I-WLAN) or trusted networks such as a code division multiple access (CDMA) network and Wimax).

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use cases may focus on only one key performance indicator (KPI). 5G supports these various use cases in a flexible and reliable method.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity in which they are always turned on in order to push real-time information and notification to a user. A cloud storage and application suddenly increases in the mobile communication platform, and this can be applied to both business and entertainment. Furthermore, the cloud storage is a special use case that tows the growth of an uplink data transfer rate. 5G is also used for remote business of cloud. When a tactile interface is used, further lower end-to-end latency is required to maintain better user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use cases relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link with ultra reliability/low available latency, such as a self-driving vehicle. A level of reliability and latency is essential for smart grid control, industry automation, robot engineering, drone control and adjustment.

Multiple use cases are described in more detail below.

5G can supplement fiber-to-the-home (FTTH) and cable-based broadband (or DOCSIS) as means for providing a stream evaluated from several hundreds of megabits per second to gigabits per second. Such fast speed is required to deliver TV with a resolution of 4K or more (6K, 8K or more) in addition to virtual reality and augmented reality. Virtual reality (VR) and augmented reality (AR) applications include immersive sports games. A specific application program may require a special network configuration. For example, in VR games, in order for game companies to minimize latency, a core server may need to be integrated with the edge network server of a network operator.

An automotive is expected to be an important and new motive power in 5G, along with many use cases for the mobile communication of an vehicle. For example, entertainment for a passenger requires a high capacity and a high mobility mobile broadband at the same time. This reason is that future users continue to expect a high-quality connection regardless of their location and speed. Another use example of the automotive field is an augmented reality dashboard. The augmented reality dashboard overlaps and displays information, that identifies an object in the dark and notifies a driver of the distance and movement of the object, over a thing seen by the driver through a front window. In the future, a wireless module enables communication between vehicles, information exchange between a vehicle and a supported infrastructure, and information exchange between a vehicle and other connected devices (e.g., devices accompanied by a pedestrian). A safety system guides alternative courses of a behavior so that a driver can drive more safely, thereby reducing a danger of an accident. A next stage will be a remotely controlled or self-driven vehicle. This requires very reliable, very fast communication between different self-driven vehicles and between an automotive and infra. In the future, a self-driving vehicle can perform all driving activities, and a driver will focus on only abnormal traffics, which cannot be identified by a vehicle itself. Technical requirements of a self-driving vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. Similar configuration may be performed for each home. All of a temperature sensor, a window and heating controller, a burglar alarm and home appliances are wirelessly connected. Many of these sensors are typically a low data transfer rate, low energy and low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of suppliers and consumers, and thus the smart grid may improve the distribution of fuel, such as electricity, in an efficient, reliable, economical, production-sustainable and automated manner. The smart grid may be considered to be another sensor network with low latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, achieving the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically demands a low data speed, but requires a wide area and reliable location information.

Embodiments of the present disclosure to be described below can be implemented through the combination or the modification in order to meet the 5G requirements described above.

The following is described in detail in relation to the technical field to which embodiments of the present disclosure to be described below can be applied.

Artificial Intelligence (AI

Artificial intelligence means the field in which artificial intelligence or methodology capable of making the artificial intelligence is researched. Machine learning means the field in which various problems handled in the artificial intelligence field are defined and methodology for solving the problems is researched. Machine learning is also defined as an algorithm for improving performance of a task through continuous experiences for the task.

An artificial neural network (ANN) is a model used in machine learning, and may refer to the entire model with a problem-solving ability which consists of artificial neurons (nodes) forming a network through a combination of synapses. The artificial neural network may be defined by a connection pattern between neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weights, and bias that are input through a synapse.

A model parameter means a parameter determined through learning, and includes the weight of a synapse connection and the bias of a neuron. Furthermore, a hyper parameter refers to a parameter that shall be configured before learning in a machine learning algorithm, and includes a learning rate, the number of times of repetitions, a mini-deployment size, and an initialization function.

The purpose of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. The deep learning is part of the machine learning. Hereinafter, the machine learning is used as a meaning including the deep learning.

Robot

A robot may mean a machine that automatically processes a given task or operates based on an autonomously owned ability. Particularly, a robot having a function for recognizing and autonomously determining an environment and performing an operation may be called an intelligent robot.

The robot may be classified for industry, medical treatment, home, and military based on its use purpose or field. The robot includes a driver including an actuator or motor, and can perform various physical operations, such as moving a robot joint. Furthermore, a movable robot includes a wheel, a brake, a propeller, etc. in the driver, and may run on the ground or fly in the air through the driver.

Self-Driving (Autonomous-Driving)

Self-driving means a technology for autonomous driving. A self-driving vehicle means a vehicle that runs without user manipulation or by user's minimum manipulation.

For example, self-driving may include all of a technology for maintaining a driving lane, a technology for automatically controlling speed such as adaptive cruise control, a technology for automatically driving along a fixed path, a technology for automatically setting and driving a path when a destination is set, and the like.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this instance, the self-driving vehicle may be considered as a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object together. However, there is a difference in that a virtual object is used to supplement a real object in the AR technology, and on the other hand, a virtual object and a real object are used as the same character in the MR technology.

The XR technology can be applied to a head-mount display (HMD), a head-up display (HUD), a mobile phone, a tablet PC, a laptop, a desktop, TV, a digital signage, and the like. A device to which the XR technology is applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from the external devices.

Examples of communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

The input unit 120 may include a camera for an image signal input, a microphone for receiving an audio signal, a user input unit for receiving information from a user, etc. Herein, the camera or the microphone is treated as a sensor, and thus a signal obtained from the camera or the microphone may be referred to as sensing data or sensor information.

The input unit 120 can obtain learning data for model learning and input data to be used when an output is obtained using a learning model. The input unit 120 can obtain not-processed input data. In this case, the processor 180 or the learning processor 130 can extract an input feature by performing pre-processing on the input data.

The learning processor 130 may be trained by a model constructed by an artificial neural network using learning data. In this case, the trained artificial neural network may be called a learning model. The learning model may be used to deduce a result value of new input data not learning data, and the deduced value may be used as a base for performing a given operation.

The learning processor 130 can perform AI processing along with a learning processor 240 of the AI server 200.

The learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 can obtain at least one of internal information of the AI device 100, surrounding environment information of the AI device 100, or user information using various sensors.

Examples of sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 can generate an output related to a visual sense, an auditory sense or a tactile sense.

The output unit 150 may include a display for outputting visual information, a speaker for outputting auditory information, and a haptic module for outputting tactile information.

The memory 170 can store data supporting various functions of the AI device 100. For example, the memory 170 can store input data obtained by the input unit 120, learning data, a learning model, a learning history, etc.

The processor 180 can determine at least one executable operation of the AI device 100 based on information that is determined or generated using a data analysis algorithm or a machine learning algorithm. Furthermore, the processor 180 can perform operation determined by controlling the components of the AI device 100.

To this end, the processor 180 can request, search, receive, or utilize data of the learning processor 130 or the memory 170, and can control the components of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 can obtain intention information for a user input and transmit user requirements based on the obtained intention information.

The processor 180 can obtain the intention information corresponding to the user input using at least one of a speech to text (STT) engine for converting a voice input into a text string or a natural language processing (NLP) engine for obtaining intention information of a natural language.

In this case, at least one of the STT engine or the NLP engine may be constructed by an artificial neural network of which at least a portion is trained according to a machine learning algorithm. Furthermore, at least one of the STT engine or the NLP engine may have been trained by the learning processor 130, may have been trained by the learning processor 240 of the AI server 200, or may have been trained by distributed processing thereof.

The processor 180 may collect history information including the feedback, etc. of the user for the operation contents or an operation of the AI device 100, and may store the history information in the memory 170 or the learning processor 130 or may transmit the history information to an external device such as the AI server 200. The collected history information may be used to update a learning model.

The processor 180 may control at least some of the components of the AI device 100 in order to run an application program stored in the memory 170. Moreover, the processor 180 may combine and operate two or more of the components included in the AI device 100 in order to run the application program.

FIG. 2 illustrates an AI server 200 according to an embodiment of the present disclosure.

Referring to FIG. 2, the AI server 200 may refer to a device which is trained by an artificial neural network using a machine learning algorithm or which uses a trained artificial neural network. Herein, the AI server 200 consists of a plurality of servers and may perform distributed processing and may be defined as a 5G network. Further, the AI server 200 may be included as a partial configuration of the AI device 100 and may perform at least a part of AI processing.

The AI server 200 may include a communication unit 210, a memory 230, a learning processor 240, and a processor 260.

The communication unit 210 may transmit and receive data to and from an external device such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network, or may be mounted on an external device such as the AI device 100 and used.

The learning model may be implemented as hardware, software or a combination of hardware and software. If a part or all of the learning model is implemented as software, one or more instructions constructing the learning model may be stored in the memory 230.

The processor 260 may deduce a result value of new input data using the learning model and generate a response or a control command based on the deduced result value.

FIG. 3 illustrates an AI system 1 according to an embodiment of the present disclosure.

Referring to FIG. 3, in the AI system 1, at least one of the AI server 200, a robot 100*a*, a self-driving vehicle 100*b*, an XR device 100*c*, a smartphone 100*d*, or home appliances 100*e* is connected to a cloud network 10. The robot 100*a*, the self-driving vehicle 100*b*, the XR device 100*c*, the smartphone 100*d* or the home appliances 100*e* to which the AI technology is applied may be called AI devices 100*a* to 100*e*.

The cloud network 10 may constitute part of cloud computing infra or may mean a network present within cloud computing infra. The cloud network 10 may be configured using the 3G network, the 4G or long term evolution (LTE) network, or the 5G network.

That is, the devices 100*a* to 100*e* and 200 constituting the AI system 1 may be interconnected over the cloud network 10. In particular, the devices 100*a* to 100*e* and 200 may communicate with each other through a base station, or may directly communicate with each other without the intervention of the base station.

The AI server 200 may include a server for performing AI processing and a server for performing calculation on big data.

The AI server 200 is connected to at least one of the robot 100*a*, the self-driving vehicle 100*b*, the XR device 100*c*, the smartphone 100*d* or the home appliances 100*e*, that are AI devices constituting the AI system 1, over the cloud network 10, and may help at least part of the AI processing of the connected AI devices 100*a* to 100*e*.

The AI server 200 can train an artificial neural network based on a machine learning algorithm in place of the AI devices 100*a* to 100*e*, and can directly store a learning model or transmit the learning model to the AI devices 100*a* to 100*e*.

The AI server 200 can receive input data from the AI devices 100*a* to 100*e*, deduce a result value of the received input data using the learning model, generate a response or control command based on the deduced result value, and transmit the response or control command to the AI devices 100a to 100e.

Alternatively, the AI devices 100a to 100e can directly deduce a result value of input data using a learning model, and can generate a response or a control command based on the deduced result value.

Various implementations of the AI devices 100a to 100e to which the above-described technologies are applied are described below. Herein, the AI devices 100a to 100e illustrated in FIG. 3 may be considered as detailed implementations of the AI device 100 illustrated in FIG. 1.

AI and Robot to which the Present Disclosure is Applicable

The AI technology is applied to the robot 100a, and the robot 100a may be implemented as a guidance robot, a transport robot, a cleaning robot, a wearable robot, an entertainment robot, a pet robot, an unmanned aerial robot, etc.

The robot 100a may include a robot control module for controlling an operation. The robot control module may mean a software module or a chip in which a software module is implemented using hardware.

The robot 100a may obtain status information of the robot 100a, detect (recognize) a surrounding environment and an object, generate map data, determine a moving path and a running plan, determine a response to a user interaction, or determine an operation, using sensor information obtained from various types of sensors.

The robot 100a may use sensor information obtained by at least one sensor of LIDAR, a radar, and a camera in order to determine the moving path and the running plan.

The robot 100a may perform the above operations using a learning model consisting of at least one artificial neural network. For example, the robot 100a may recognize a surrounding environment and an object using the learning model, and determine an operation using the recognized surrounding environment information or object information. Herein, the learning model may have been directly trained in the robot 100a or may have been trained in an external device such as the AI server 200.

The robot 100a may directly generate results using the learning model and perform an operation, but may perform an operation by transmitting sensor information to an external device such as the AI server 200 and receiving results generated in response to this.

The robot 100a may determine the moving path and the running plan using at least one of map data, object information detected from sensor information, or object information obtained from the external device. The robot 100a may run along the determined moving path and running plan by controlling the driver.

The map data may include object identification information for various objects disposed in the space in which the robot 100a moves. For example, the map data may include object identification information for fixed objects, such as a wall and a door, and movable objects, such as a flowerport and a desk. Furthermore, the object identification information may include a name, a type, a distance, a location, etc.

Furthermore, the robot 100a may perform an operation or run by controlling the driver based on a user's control/interaction. In this case, the robot 100a may obtain intention information of interaction according to a user's behavior or voice utterance, may determine a response based on the obtained intention information, and may perform an operation.

AI and Self-Driving to which the Present Disclosure is Applicable

The AI technology is applied to the self-driving vehicle 100b, and the self-driving vehicle 100b may be implemented as a mobile robot, a vehicle, an unmanned aerial vehicle, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as the component of the self-driving vehicle 100b, but may be configured as separate hardware outside the self-driving vehicle 100b and connected to the self-driving vehicle 100b.

The self-driving vehicle 100b may obtain status information of the self-driving vehicle 100b, detect (recognize) a surrounding environment and object, generate map data, determine a moving path and a running plan, or determine an operation, using sensor information obtained from various types of sensors.

In order to determine the moving path and the running plan, the self-driving vehicle 100b may use sensor information obtained from at least one sensor among LIDAR, a radar and a camera, in the same manner as the robot 100a.

Particularly, the self-driving vehicle 100b may recognize an environment or an object in an area in which a sight is blocked or an area of a predetermined distance or more by receiving sensor information from external devices, or may receive information that is directly recognized from the external devices.

The self-driving vehicle 100b may perform the above operations using a learning model consisting of at least one artificial neural network. For example, the self-driving vehicle 100b may recognize a surrounding environment and object using a learning model and determine a running path using the recognized surrounding environment information or object information. Herein, the learning model may have been directly trained in the self-driving vehicle 100b or may have been trained in an external device such as the AI server 200.

In this instance, the self-driving vehicle 100b may directly generate results using the learning model to perform an operation, but may perform an operation by transmitting sensor information to an external device such as the AI server 200 and receiving results generated in response to this.

The self-driving vehicle 100b may determine a moving path and a running plan using at least one of map data, object information detected from sensor information, or object information obtained from an external device. The self-driving vehicle 100b may run based on the determined moving path and running plan by controlling the driver.

The map data may include object identification information for various objects disposed in the space (e.g., road) on which the self-driving vehicle 100b runs. For example, the map data may include object identification information for fixed objects, such as a streetlight, a rock, and a building, etc., and mobile objects, such as a vehicle and a pedestrian. Furthermore, the object identification information may include a name, a type, a distance, a location, etc.

Furthermore, the self-driving vehicle 100b may perform an operation or run by controlling the driver based on a user's control/interaction. In this case, the self-driving vehicle 100b may obtain intention information of an interaction according to a user' behavior or voice speaking, may determine a response based on the obtained intention information, and may perform an operation.

AI and XR to which the Present Disclosure is Applicable

The AI technology is applied to the XR device 100c, and the XR device 100c may be implemented as a head-mount display (HMD), a head-up display (HUD) provided in a vehicle, television, a mobile phone, a smartphone, a computer, a wearable device, home appliances, a digital signage, a vehicle, a fixed robot or a mobile robot.

The XR device 100c may generate location data and attributes data for three-dimensional (3D) points by analyzing 3D point cloud data or image data obtained through various sensors or from an external device, may obtain information on a surrounding space or real object based on the generated location data and attributes data, and may output an XR object by rendering the XR object. For example, the XR device 100c may output an XR object including additional information for a recognized object by making the XR object correspond to the corresponding recognized object.

The XR device 100c may perform the above operations using a learning model consisting of at least one artificial neural network. For example, the XR device 100c may recognize a real object in 3D point cloud data or image data using a learning model, and may provide information corresponding to the recognized real object. In this case, the learning model may have been directly trained in the XR device 100c or may have been trained in an external device such as the AI server 200.

In this instance, the XR device 100c may directly generate results using a learning model and perform an operation, but may perform an operation by transmitting sensor information to an external device such as the AI server 200 and receiving results generated in response to this.

AI, Robot and Self-Driving to which the Present Disclosure is Applicable

The AI technology and the self-driving technology are applied to the robot 100a, and the robot 100a may be implemented as a guidance robot, a transport robot, a cleaning robot, a wearable robot, an entertainment robot, a pet robot, an unmanned aerial robot, etc.

The robot 100a to which the AI technology and the self-driving technology are applied may mean a robot itself having a self-driving function, or may mean the robot 100a interacting with the self-driving vehicle 100b.

The robot 100a with the self-driving function may collectively refer to devices that move by itself along a given path without control of a user or determine by itself a moving path and move.

The robot 100a with the self-driving function and the self-driving vehicle 100b may use a common sensing method to determine one or more of a moving path or a running plan. For example, the robot 100a with the self-driving function and the self-driving vehicle 100b may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or an operation associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if it is determined that a driver is in a drowsiness state, the robot 100a may activate the self-driving function of the self-driving vehicle 100b or assist control of a driving unit of the self-driving vehicle 100b. Herein, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information including signal information, etc., as in a smart traffic light, and may automatically connect an electric charger to a filling inlet through an interaction with the self-driving vehicle 100b as in the automatic electric charger of an electric vehicle.

AI, Robot and XR to which the Present Disclosure is Applicable

The AI technology and the XR technology are applied to the robot 100a, and the robot 100a may be implemented as a guidance robot, a transport robot, a cleaning robot, a wearable robot, an entertainment robot, a pet robot, an unmanned aerial robot, a drone, etc.

The robot 100a to which the XR technology is applied may mean a robot that is a target of control/interaction within an XR image. In this case, the robot 100a is different from the XR device 100c, and they may operate in conjunction with each other.

If the robot 100a that is a target of control/interaction within the XR image obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at time of the robot 100a remotely operating in conjunction through an external device such as the XR device 100c, may adjust a self-driving path of the robot 100a through an interaction, may control an operation or driving, or may identify information of a surrounding object.

AI, Self-Driving and XR to which the Present Disclosure is Applicable

The AI technology and the XR technology are applied to the self-driving vehicle 100b, and the self-driving vehicle 100b may be implemented as a mobile robot, a vehicle, an unmanned aerial vehicle, etc.

The self-driving vehicle 100b to which the XR technology is applied may mean a self-driving vehicle provided with a means for providing an XR image or a self-driving vehicle that is a target of control/interaction within the XR image. Particularly, the self-driving vehicle 100b that is the target of control/interaction within the XR image is different from the XR device 100c, and they may operate in conjunction with each other.

The self-driving vehicle 100b provided with the means for providing the XR image may obtain sensor information from sensors including a camera, and may output the XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least a part of the XR object may be output to overlap with a real object toward which a passenger's view is directed. On the other hand, when the XR object is output to a display included within the self-driving vehicle 100b, at least a part of the XR object may be output to overlap with an object within a screen. For example, the self-driving vehicle 100b may output XR objects corresponding to objects, such as a carriageway, other vehicles, a traffic light, a signpost, a two-wheeled vehicle, a pedestrian, and a building.

If the self-driving vehicle 100b that is a target of control/interaction within an XR image obtains sensor information from sensors including a camera, the self-driving vehicle 100b or the XR device 100c may create an XR image based on the sensor information, and the XR device 100c may output the created XR image. Furthermore, the self-driving vehicle 100b may operate based on a control signal received through an external device, such as the XR device 100c, or a user's interaction.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution or a clean-state structure of an existing mobile communication network structure.

The 5G system is defined as service-based, and the interaction between network functions (NFs) in architecture for the 5G system can be represented in two ways as follows.

Reference point representation: shows the interaction between NF services in NFs described by a point-to-point reference point (e.g., N11) between two NFs (e.g., AMF and SMF).

Service-based representation: network functions (e.g., AMF) within a control plane (CP) enable other authorized network functions to access their services. This representation also includes a point-to-point reference point, if necessary.

Overview of 3GPP System

FIG. 4 illustrates various reference points.

In an example of a network structure illustrated in FIG. 4, the SGW and the PDN GW are configured as separate gateways, but the two gateways may be implemented according to a single gateway configuration option.

The MME is an element to perform signaling and control functions for supporting access to the network connection of the UE, allocation, tracking, paging, roaming, and handover of network resources, and so on. The MME controls control plane functions related to subscribers and session management. The MME manages a large number of eNBs and performs signaling of the conventional gateway selection for handover to other 2G/3G networks. Further, the MME performs functions of security procedures, terminal-to-network session handling, idle terminal location management, etc.

The SGSN handles all packet data such as mobility management and authentication of the user for another 3GPP network (e.g., GPRS network).

The ePDG serves as a security node for an untrusted non-3GPP network (e.g., I-WLAN, WiFi hotspot, etc.)

As described with reference to FIG. 4, the UE with IP capability can access the IP service network (e.g., IMS) provided by a service provider (i.e., operator) via various components within the EPC based on the non-3GPP access as well as the 3GPP access.

For example, reference points such as S1-U and S1-MME can connect two functions present in different functional entities. The 3GPP system defines a conceptual link connecting two functions present in different functional entities of E-UTRAN and EPC, as a reference point. The following Table 1 summarizes reference points illustrated in FIG. 4. In addition to the example of Table 1, various reference points can exist depending on the network structure.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 4, S2a and S2b correspond to non-3GPP interfaces. S2a is a reference point to provide a user plane with related control and mobility support between the trusted non-3GPP access and the PDN GW. S2b is a reference point to provide a user plane with related control and mobility support between the ePDG and the PDN GW.

FIG. 5 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VoIP)) through IMS and packet data.

Referring to FIG. 5, an E-UMTS network includes an E-UTRAN, an EPC, and one or more UEs. The E-UTRAN consists of eNBs that provide control plane and user plane protocols to the UE, and the eNBs are interconnected with each other by means of the X2 interface.

X2 user plane (X2-U) interface is defined between the eNBs. The X2-U interface provides non-guaranteed delivery of a user plane packet data unit (PDU). X2 control plane (X2-CP) interface is defined between two neighboring eNBs. The X2-CP performs functions of context delivery between the eNBs, control of user plane tunnel between a source eNB and a target eNB, delivery of handover-related messages, uplink load management, and the like.

The eNB is connected to the UE via a radio interface and is connected to an evolved packet core (EPC) by means of the S1 interface.

S1 user plane (S1-U) interface is defined between the eNB and a serving gateway (S-GW). S1 control plane interface (S1-MME) is defined between the eNB and a mobility management entity (MME). The S1 interface performs functions of evolved packet system (EPS) bearer service management, non-access stratum (NAS) signaling transport, network sharing, MME load balancing, and so on. The S1 interface supports many-to-many-relation between the eNB and the MME/S-GW.

The MME can perform various functions such as NAS signaling security, access stratum (AS) security control, inter-core network (CN) node signaling for supporting mobility between 3GPP access networks, idle mode UE reachability (including control and execution of paging retransmission), tracking area identity (TAI) management (for UE in idle and active modes), PDN GW and SGW selection, MME selection for handover with MME change, SGSN selection for handover to 2G or 3G 3GPP access networks, roaming, authentication, bearer management functions including dedicated bearer establishment, support of public warning system (PWS) (including earthquake and tsunami warning system (ETWS) and commercial mobile alert system (CMAS)) message transmission, and the like.

FIG. 6 illustrates an example of a general architecture of E-UTRAN and EPC.

As illustrated in FIG. 6, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging generation in the EPC, management of an LTE_IDLE state, ciphering of a user plane, SAE bearer control, and ciphering and integrity protection of NAS signaling.

Annex J of 3GPP TR 23.799 shows various architectures by combining 5G and 4G. An architecture using NR and NGC is disclosed in 3GPP TS 23.501.

FIG. 7 illustrates an example of a structure of a radio interface protocol in a control plane between a UE and eNB. FIG. 8 illustrates an example of a structure of a radio interface protocol in a user plane between a UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems.

The layers of the radio protocol in the control plane illustrated in FIG. 7 and the layers of the radio protocol in the user plane illustrated in FIG. 8 are described below.

The physical layer, the first layer, provides an information transfer service using a physical channel. The physical layer is connected with a medium access control (MAC) layer located at a higher level via a transport channel, and data between the MAC layer and the physical layer is transferred via the transport channel. Data is transferred between different physical layers, i.e., between physical layers of a transmission side and a reception side via the physical channel.

The physical channel consists of several subframes on a time axis and several subcarriers on a frequency axis. Here, one subframe consists of a plurality of OFDM symbols and a plurality of subcarriers on the time axis. One subframe consists of a plurality of resource blocks, and one resource block consists of a plurality of OFDM symbols and a plurality of subcarriers. A unit time, a transmission time interval (TTI), at which data is transmitted is 1 ms corresponding to one subframe.

Physical channels existing in the physical layers of the transmission side and the reception side may be divided into a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels, according to 3GPP LTE.

There are several layers in the second layer. A medium access control (MAC) layer of the second layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane according to a type of transmitted information.

The MAC layer of the second layer segments and concatenate data received from the upper layer and adjusts a data size so that a lower layer is adapted to transmit data to a radio section.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. In the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC_IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. For example, the cases may include an attempt of a user to make a phone call, an attempt to transmit data, or transmission of a response message when receiving a paging message from the E-UTRAN.

A non-access stratum (NAS) layer positioned over the RRC layer performs functions such as session management and mobility management.

The NAS layer illustrated in FIG. 7 is described in detail below.

The evolved session management (ESM) belonging to the NAS layer performs functions such as default bearer management and dedicated bearer management, and is responsible for controlling the UE to use a PS service from a network. The default bearer resources are allocated from a network when they are accessed to the network upon first access to a specific packet data network (PDN). In this instance, the network allocates an IP address available for the UE so that the UE can use a data service, and also allocates QoS of a default bearer. LTE roughly supports two types of bearers including a bearer with guaranteed bit rate (GBR) QoS characteristics for guaranteeing a specific bandwidth for data transmission/reception and a non-GBR bearer with best effort QoS characteristics without guaranteeing a bandwidth. The default bearer is allocated the non-GBR bearer. The dedicated bearer may be allocated a bearer with GBR or non-GBR QoS characteristics.

A bearer that the network allocates to the UE is referred to as an evolved packet service (EPS) bearer. When the network allocates the EPS bearer to the UE, the network assigns one ID. This ID is called an EPS bearer ID. One EPS bearer has QoS characteristics of a maximum bit rate (MBR) and/or a guaranteed bit rate (GBR).

FIG. 9 illustrates a general architecture of NR-RAN.

Referring to FIG. 9, the NR-RAN node may be one of the followings.

gNB providing NR user plane and control plane protocols towards the UE; or ng-eNB providing E-UTRA user plane and control plane protocols towards the UE.

The gNB and the ng-eNB are interconnected with each other by means of the Xn interface. The gNB and ng-eNB are also interconnected with the access and mobility management function (AMF) by means of the NG interface to 5GC, more specifically, by means of the NG-C interface, and are interconnected with the user plane function (UPF) by means of the NG-U interface (see 3GPP TS 23.501 [3]).

For reference, architecture and F1 interface for functional split are defined in 3GPP TS 38.401 [4].

FIG. 10 illustrates an example of general functional split between NG-RAN and 5GC.

Referring to FIG. 10, yellow boxes depict logical nodes, and white boxes depict main functions.

The gNB and ng-eNB host the following functions.

Functions for Radio Resource Management: radio bearer control, radio admission control, connection mobility control, and dynamic allocation of resources to UEs in both uplink and downlink (scheduling);

IP header compression, encryption and integrity protection of data;

Selection of an AMF at IMT-2000 3GPP-UE attachment when no routing to an AMF can be determined from the information provided by the UE;

Routing of user plane data towards UPF(s);

Routing of control plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session management;

Support of network slicing;

QoS flow management and mapping to data radio bearers;

Support of UEs in RRC_INACTIVE state;
Distribution function for NAS messages;
Radio access network sharing;
Dual connectivity;
Tight interworking between NR and E-UTRA.

The AMF hosts the following main functions (see 3GPP TS 23.501 [3]).

NAS signalling termination;
NAS signalling security;
AS security control;
Inter CN node signalling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing;
SMF selection.

The UPF hosts the following main functions (see 3GPP TS 23.501 [3]).

Anchor point for intra-/inter-RAT mobility (when applicable);
External PDU session point of interconnect to data network;
Packet routing and forwarding;
Packet inspection and user plane part of policy rule enforcement;
Traffic usage reporting;
Uplink classifier to support routing traffic flows to a data network;
Branching point to support multi-homed PDU session;
QoS handling for user plane (e.g., packet filtering, gating, UL/DL rate enforcement);
Uplink traffic verification (SDF to QoS flow mapping);
Downlink packet buffering and downlink data notification triggering.

The session management function (SMF) hosts the following main functions (see 3GPP TS 23.501 [3]).

Session management;
UE IP address allocation and management;
Selection and control of UP function;
Configure traffic steering at UPF to route traffic to proper destination;
Control part of policy enforcement and QoS;
Downlink data notification.

FIG. 11 illustrates an example of a general architecture of 5G.

The following is given a description for each reference interface and each node illustrated in FIG. 11.

An access and mobility management function (AMF) supports functions of inter-CN node signaling for mobility between 3GPP access networks, termination of radio access network (RAN) CP interface (N2), termination of NAS signaling (N1), registration management (registration area management), idle mode UE reachability, support of network slicing, SMF selection, and the like.

Some or all of the functions of the AMF can be supported in a single instance of one AMF.

A data network (DN) means, for example, operator services, internet access, or 3rd party service, etc. The DN transmits a downlink protocol data unit (PDU) to the UPF or receives the PDU transmitted from the UE from the UPF.

A policy control function (PCF) receives information about packet flow from an application server and provides functions of determining policies such as mobility management and session management.

A session management function (SMF) provides a session management function. If the UE has a plurality of sessions, the sessions can be respectively managed by different SMFs.

Some or all of the functions of the SMF can be supported in a single instance of one SMF.

A unified data management (UDM) stores subscription data of user, policy data, etc.

A user plane function (UPF) transmits the downlink PDU received from the DN to the UE via the (R)AN and transmits the uplink PDU received from the UE to the DN via the (R)AN.

An application function (AF) interacts with 3GPP core network to provide services (e.g., to support functions of an application influence on traffic routing, network capability exposure access, interaction with policy framework for policy control, and the like).

A (radio) access network (R)AN collectively refers to a new radio access network supporting both evolved E-UTRA, that is an evolved version of 4G radio access technology, and a new radio (NR) access technology (e.g., gNB).

The gNB supports functions for radio resource management (i.e., radio bearer control, radio admission control, connection mobility control, and dynamic allocation of resources to UEs in uplink/downlink (i.e., scheduling)).

The UE means a user equipment.

In the 3GPP system, a conceptual link connecting between the NFs in the 5G system is defined as a reference point.

N1 is a reference point between the UE and the AMF, N2 is a reference point between the (R)AN and the AMF, N3 is a reference point between the (R)AN and the UPF, N4 is a reference point between the SMF and the UPF, N6 is a reference point between the UPF and the data network, N9 is a reference point between two core UPFs, N5 is a reference point between the PCF and the AF, N7 is a reference point between the SMF and the PCF, N24 is a reference point between the PCF in the visited network and the PCF in the home network, N8 is a reference point between the UDM and the AMP, N10 is a reference point between the UDM and the SMF, N11 is a reference point between the AMF and the SMF, N12 is a reference point between the AMP and an authentication server function (AUSF), N13 is a reference point between the UDM and the AUSF, N14 is a reference point between two AMFs, N15 is a reference point between the PCF and the AMP in case of non-roaming scenario and a reference point between the PCF in the visited network and the AMF in case of roaming scenario, N16 is a reference point between two SMFs (reference point between the SMF in the visited network and the SMF in the home network in case of roaming scenario), N17 is a reference point between AMF and 5G-equipment identity register (EIR), N18 is a reference point between the AMF and an unstructured data storage function (UDSF), N22 is a reference point between the AMF and a network slice selection function (NSSF), N23 is a reference point between the PCF and a network data analytics function (NWDAF), N24 is a reference point between the NSSF and the NWDAF, N27 is a reference point between a network repository function (NRF) in the visited network and the NRF in the home network, N31 is a reference point between NSSF in the visited network and NSSF in the home network, N32 is a reference point between security protection proxy (SEPP) in the visited network and SEPP in the home network, N33 is a reference point between a network exposure function (NEF) and the AF, N40 is a reference point between the SMF and a charging function (CHF), and N50 is a reference point between the AMF and a circuit bearer control function (CBCF).

FIG. 11 illustrates a reference model where the UE accesses to one DN using one PDU session, by way of example, for convenience of explanation, but the present invention is not limited thereto.

The following has been described based on the EPS system using the eNB for convenience of explanation. However, the EPS system may be replaced with the 5G system by replacing the eNB by the gNB, the mobility management (MM) function of the MME by the AMF, the SM function of S/P-GW by the SMF, and the user plane-related function of the S/P-GW by the UPF.

In the above, the present disclosure has been described based on the EPS, but the corresponding content can be supported by going through similar operations through processes/messages/information for similar purpose in the 5G system.

Paging Method Defined in E-UTRA

Continuous Reception for Paging

The UE may use discontinuous reception (DRX) in an idle mode in order to reduce power consumption. One paging occasion (PO) is a subframe where there may be P-RNTI transmitted on MTC PDCCH (MPDCCH) or for NB-IoT on narrowband PDCCH (NPDCCH) addressing a paging message. In case of the P-RNTI transmitted on the MPDCCH, the PO refers to a starting subframe of MPDCCH repetitions. In case of the P-RNTI transmitted on the NPDCCH, the PO refers to a starting subframe of NPDCCH repetitions unless a subframe determined by the PO is not a valid NB-IoT downlink subframe. Then, a first valid NB-IoT downlink subframe after the PO is a starting subframe of the NPDCCH repetitions. The paging message is same for both RAN initiated paging and CN initiated paging.

The UE initiates an RRC Connection Resume procedure upon receiving RAN paging. If the UE receives a CN initiated paging in an RRC_INACTIVE state, the UE moves to RRC_IDLE and informs NAS.

One paging frame (PF) is one radio frame, which may contain one or multiple paging occasion(s). When the DRX is used, the UE needs only to monitor one PO per DRX cycle.

One paging narrowband (PNB) is one narrowband on which the UE performs the paging message reception.

The PF, the PO, and the PNB are determined by following equation using DRX parameters provided in system information (SI).

The PF is given by the following equation.

$$\text{SFN mod } T = (T \text{ div } N)*(\text{UE\_ID mod } N) \quad [\text{Equation 1}]$$

An index i_s pointing to the PO from a subframe pattern defined in section 7.2 of the standard document is derived from the following calculation.

$$i\_s = \text{floor}(\text{UE\_ID}/N) \bmod Ns \quad [\text{Equation 2}]$$

If the P-RNTI is monitored on the MPDCCH, the PNB is determined by the following equation.

$$\text{PNB} = \text{floor}(\text{UE\_ID}/(N*Ns)) \bmod Nn \quad [\text{Equation 3}]$$

If the P-RNTI is monitored on the NPDCCH and the UE supports paging configuration on a non-anchor carrier, and if paging configuration for non-anchor carrier is provided in system information, then the paging carrier is determined by the paging carrier with smallest index n (0≤n≤Nn−1) fulfilling the following Equation 4.

$$\text{floor}(\text{UE\_ID}/(N*Ns)) \bmod W < W(0)+W(1)+\ldots+W(n) \quad [\text{Equation 4}]$$

System information DRX parameters stored in the UE are updated locally in the UE whenever DRX parameter values are changed in the system information. If the UE has no IMSI, for example, when making an emergency call without USIM, the UE uses/applies as default identity UE_ID=0 in the PF, i_s, and PNB formulas above.

The following parameters are used for the calculation of the PF, i_s, PNB, and the NB-IoT paging carrier.

T: DRX cycle of the UE. Except for NB-IoT, if a UE specific extended DRX value of 512 radio frames is configured by upper layers according to section 7.3 of the standard document, T is 512. Otherwise, T is determined by the shortest value of the UE specific DRX value, if allocated by upper layers, and a default DRX value broadcasted in system information. If UE specific DRX is not configured by upper layers, the default value is applied. The UE specific DRX is not applicable for NB-IoT. In the RRC_INACTIVE state, T is determined by the shortest value of the RAN paging cycle, the UE specific paging cycle, and the default paging cycle, if allocated by upper layers.

nB: 4T, 2T, T, T/2, T/4, T/8, T/16, T/32, T/64, T/128, and T/256, and for NB-IoT also T/512, and T/1024.

N: minimum value of T and nB

Ns: maximum value of 1 and nB/T

Nn: number of paging narrowbands (for P-RNTI monitored on MPDCCH) or paging carriers (for P-RNTI monitored on NPDCCH) provided in system information UE_ID is determined as follows:

IMSI mod 1024, if P-RNTI is monitored on PDCCH.

IMSI mod 4096, if P-RNTI is monitored on NPDCCH.

IMSI mod 16384, if P-RNTI is monitored on MPDCCH or if P-RNTI is monitored on NPDCCH and the UE supports paging on a non-anchor carrier, and if paging configuration for non-anchor carrier is provided in system information.

W(i): Weight for NB-IoT paging carrier i.

W: Total weight of all NB-IoT paging carriers (e.g., W=W(0)+W(1)+ . . . +W(Nn−1).

IMSI is given as sequence of digits of type Integer (0, . . . , 9), and IMSI in the equation above shall be interpreted as a decimal integer number, where the first digit given in the sequence represents the highest order digit.

For example, in the calculations of IMSI=12 (digit1=1, digit2=2), this shall be interpreted as the decimal integer "12", not "1×16+2=18".

Subframe Patterns

FDD:

If P-RNTI is transmitted on PDCCH or NPDCCH, or if P-RNTI is transmitted on MPDCCH with system bandwidth >3 MHz, the PO is determined as the following Table 2.

TABLE 2

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

If P-RNTI is transmitted on MPDCCH with system bandwidth of 1.4 MHz and 3 MHz. the PO is determined as the following Table 3.

TABLE 3

| Ns | PO when i_s = 0 | PO when i_s = 1 | PO when i_s = 2 | PO when i_s = 3 |
|---|---|---|---|---|
| 1 | 5 | N/A | N/A | N/A |
| 2 | 5 | 5 | N/A | N/A |
| 4 | 5 | 5 | 5 | 5 |

TDD (all UL/DL configurations): —If P-RNTI is transmitted on PDCCH or NPDCCH, or if P-RNTI is transmitted on MPDCCH with system bandwidth >3 MHz, the PO is determined as the following Table 4.

TABLE 4

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

If P-RNTI is transmitted on MPDCCH with system bandwidth of 1.4 MHz and 3 MHz, the PO is determined as the following Table 5.

TABLE 5

| Ns | PO when i_s = 0 | PO when i_s = 1 | PO when i_s = 2 | PO when i_s = 3 |
|---|---|---|---|---|
| 1 | 1 | N/A | N/A | N/A |
| 2 | 1 | 6 | N/A | N/A |
| 4 | 1 | 1 | 6 | 6 |

Paging Method Defined in 5G-NR

Discontinuous Reception for Paging

The UE may use discontinuous reception (DRX) in RRC_IDLE and RRC_INACTIVE states in order to reduce power consumption. The UE monitors one paging occasion (PO) per DRX cycle. A PO is a set of PDCCH monitoring occasions and can consist of multiple time slots (e.g., subframe or OFDM symbol) where paging DCI can be sent (TS 38.213 [4]). One paging frame (PF) is one radio frame and may contain one or multiple PO(s) or a starting point of a PO.

In multi-beam operations, the length of one PO is one period of beam sweeping, and the UE can assume that the same paging message is repeated in all beams of the sweeping pattern, and thus the selection of the beam(s) for the reception of the paging message is up to UE implementation. The paging message is same for both RAN initiated paging and CN initiated paging.

The UE initiates RRC Connection Resume procedure upon receiving RAN paging. If the UE receives a CN initiated paging in the RRC_INACTIVE state, the UE moves to RRC_IDLE and informs NAS of the corresponding information. The PF and the PO are determined by the following formulae.

SFN for the PF is determined by the following Equation 5.

$$(SFN+PF\_offset) \bmod T = (T \text{ div } N)*(UE\_ID \bmod N) \quad \text{[Equation 5]}$$

Index (i_s), indicating the start of a set of PDCCH monitoring occasions for the paging DCI, is determined by the following Equation 6.

$$i\_s = \text{floor}(UE\_ID/N) \bmod Ns \quad \text{[Equation 6]}$$

The PDCCH monitoring occasions for paging are determined according to paging-SearchSpace and firstPDCCH-MonitoringOccasionOfPO defined in TS 38.213 [4] section 10, if configured. Otherwise, the PDCCH monitoring occasions for paging are determined according to the default association. For example, PDCCH monitoring occasions for paging are same as for RMSI as defined in Section 13 in TS 38.213 [4].

For the default association, Ns is either 1 or 2. For Ns=1, there is only one PO which starts in the PF. For Ns=2, PO is either in the first half frame (i_s=0) or the second half frame (i_s=1) of the PF.

For non-default association (i.e., when paging-SearchSpace is used), the UE monitors the $(i\_s+1)^{th}$ PO where the first PO starts in the PF. The PDCCH monitoring occasions for paging which are not overlapping with uplink symbols are sequentially numbered from zero starting from the first PDCCH monitoring occasion for paging in the PF. When firstPDCCH-MonitoringOccasionOfPO is present, the $(i\_s+1)^{th}$ PO is a set of 'S' consecutive PDCCH monitoring occasions for paging starting from the PDCCH monitoring occasion indicated by firstPDCCH-MonitoringOccasionOfPO (e.g., the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the $(i\_s*S)^{th}$ PDCCH monitoring occasion for paging, where 'S' is the number of actual transmitted SSBs determined according to ssb-PositionsInBurst in SystemInformationBlock1. The $K^{th}$ PDCCH monitoring occasion for paging in the PO corresponds to the $K^{th}$ transmitted SSB.

The following parameters are used for the calculation of PF and i_s above.

T: DRX cycle of the UE. T is determined by the shortest of the UE specific DRX value, if configured by RRC or upper layers, and a default DRX value broadcasted in system information. If UE specific DRX is not configured by RRC or by upper layers, the default value is applied to T.

N: number of total paging frames in T

Ns: number of paging occasions for a PF

PF_offset: offset used for PF determination

UE_ID: 5G-S-TMSI mod 1024

Parameters N, Ns, first-PDCCH-MonitoringOccasionOfPO, and PF_offset and the length of default DRX cycle are signaled in SIB1.

If the UE has no 5G-S-TMSI (for example, when the UE has not yet registered onto the network), the UE uses as default identity UE_ID=0 in the PF and i_s formulas above.

5G-S-TMSI is a 48 bit long bit string as defined in TS 23.501[10]. 5G-S-TMSI in the formulae above shall be interpreted as a binary number where the left most bit represents the most significant bit.

Embodiments of the Present Disclosure

A large number of UEs supporting multi-SIMs are spreading in developing countries. For example, in these countries, there are many mobile network operators that provide voice and data, and the respective operators have advantages in different fields.

Hence, a plurality of SIM cards including SIM cards for voice communication operators and SIM cards for data communication, etc. are mounted on the UEs, and a user receives a service from the voice communication operator using the plurality of SIM cards. In other cases, since each operator has a different service area, a plurality of SIM cards may be installed in order to provide more flexible service.

However, the LTE system and the NR system support a large number of frequency bands, and hence, most UEs have limitations in function. That is, most UEs have one modem/AP, and each modem/AP supports only a frequency band suitable for an area in which each UE is released. In order to support various frequency bands, the size of the UE is inevitably increased, the battery consumption is increased, and a plurality of modems must be installed. As a result, the product price of the UE is inevitably increased.

To solve this, UEs that follow the dual SIM-dual standby technology are widely used. That is, the UE can support two SIM cards at the same time by transitioning between network/system that are provided in each SIM card while sharing one modem. For example, if for SIM card 1, the UE has to monitor paging reception from network/system 1 supported in the SIM card 1 every 1 to 10 seconds, and if for SIM card 2, the UE has to monitor paging reception from network/system 2 supported in the SIM card 2 every 5 to 10 seconds, the UE can monitor paging reception from the network/system 1 at 1/11/21/31 seconds and monitor paging reception from the network/system 2 at 5/15/25/35 seconds through the adjustment of RF chain. In this case, even if the UE uses only one modem, the UE can monitor paging receptions from the two networks/systems.

However, in the above method, if paging cycles from different networks/systems are the same, or if paging offsets from different networks/systems are the same, the following problem occurs. For example, in the above example, if a starting point of paging reception from the network/system 2 is intervals of 1 to 10 seconds in the same manner as a starting point of paging reception from the network/system 1, both the network/system 1 and the network/system 2 transmit the paging to the UE at the same time. In this case, since the UE cannot simultaneously monitor paging from different networks/systems due to hardware limitations, if the UE receives paging from the network/system 2 while monitoring the network/system 1, the UE does not monitor and misses the paging received from the network/system 2. In particular, if the missed paging is an emergency service, for example, a voice call, there occurs a problem in that a user interface or a user experience is degraded.

Accordingly, the present disclosure provides a method for a UE to stably receive different services connected to different SIM cards in a situation where a plurality of SIM cards supporting a plurality of networks/systems are connected to the UE.

First Embodiment

In a first embodiment, for a plurality of SIM cards connected to a UE, the UE attempts to register with network/system connected to each SIM card.

If the registration attempt is successful, the UE may check (monitor) whether a conflict (overlap) occurs in paging occasions or paging frames where the UE shall perform the monitoring in each network to which the UE registers. Here, the fact that a conflict (overlap) occurs in paging occasions or paging frames from different networks may mean that at least some of times, at which the UE receives paging signals transmitted from the different networks, overlap each other.

If the UE cannot simultaneously monitor paging occasions or paging frames from different networks since an overlap (conflict) occurs between the paging occasions or the paging frames from the different networks that the UE shall monitor, the UE may select one of the networks related to the paging occasions or the paging frames in which the conflict occurs.

If one of the plurality of networks is selected, the UE may inform the selected network that the UE cannot normally receive the paging due to the conflict between the paging occasions or the paging frames. The UE may also transmit, to the network, a request to change a parameter related to the paging (e.g., parameter value related to the calculation of the paging occasion or the paging frame).

If information informing that the UE cannot normally receive the paging or a request to change a parameter related to the paging (e.g., value related to the calculation of paging timing) is received from the UE, the network transmits, to the corresponding UE, a new parameter that can be used for the reception of paging.

Afterwards, if the new parameter is received, the UE may calculate the paging occasion and the paging frame using the received new parameter, and determine paging timing from each network using the calculated paging occasion and paging frame.

However, if a conflict occurs again in the paging occasion or the paging frame calculated using the new parameter as above, the UE may request again another new parameter and perform again the above-described operation again using the new parameter.

Example 1 of First Embodiment

For example, in the first embodiment, the network may transmit, to the UE, paging IMSI information (value) (i.e., information with a similar purpose to a name of paging IMSI).

Subsequently, the UE may calculate a paging frame, instead of original IMSI information, using the paging IMSI information or other type of information (value) with a similar purpose to this. However, this is merely an example, and the present disclosure is not limited thereto.

Example 1-1 of First Embodiment

In the 5GS system, the UE may calculate a paging location/timing using 5G-S-TMSI. That is, the IMSI information or other type of information with a similar purpose to this may refer to information to be used in place of 5G-S-TMSI. However, this is merely an example, and the present disclosure is not limited thereto.

Example 2 of First Embodiment

FIG. 12 illustrates a flow of signal transmission and reception between a plurality of networks and a UE according to an embodiment of the present disclosure.

As illustrated in FIG. 12, a UE (1210) performs registration to a system 1 via a radio access network (RAN) 1 (1211) and a core network (CN) 1 (1213), and transmits and receives paging signals from the system 1, in S1201.

In the same manner, the UE performs registration to a system 2 via a RAN 2 (1212) and a CN 2 (1214), and transmits and receives paging signals from the system 2, in S1203.

After the step S1201 and the step S1203, the UE may obtain first monitoring time points for the paging signals received from the system 1 and second monitoring time points for the paging signals received from the system 2, and may check that a conflict has occurred between the first monitoring time points and the second monitoring time points, in S1205.

After checking that the conflict has occurred between the paging signals received from the system 1 and the paging signals received from the system 2, the UE may report information related to a conflict occasion to the CN 2 related to the system 2 via the RAN 2 related to the system 2 among the system 1 and the system 2, in S1207. In other words, when the UE checks that the conflict has occurred between the first monitoring time points and the second monitoring time points, the UE may transmit, to the first system (network), a request to change the first monitoring time point that shall check whether a paging message is received to a plurality of systems (networks). Further, a method for the UE to report information related to the conflict occasion to the CN 2 is described in detail in the following example 2-1 of the first embodiment.

Subsequently, the CN 2 may transmit updated paging signal timing information to the UE via the RAN 2, in S1209. The paging signal timing information may be IMSI value or ID information containing information related to a transmission timing of the paging signal of the CN 2 or a reception timing of the paging signal of the UE. In other words, the CN 2 transmits system information, that can allow the UE to change a time at which paging occasion (PO)/paging frame (PF) of the system 2 is monitored, via the RAN 2. For example, the CN 2 (system 2) may transmit, to the UE, p-IMSI or new 5G-S-TMSI that the UE can use to calculate a new paging occasion/paging frame.

Next, the UE may update a paging occasion/frame monitoring timing based on the updated paging signal timing information transmitted from the CN 2 via the RAN 2, in S1211. In other words, the UE may calculate a paging occasion/paging frame related to the paging signal transmitted from the system 2 based on the updated paging signal timing information. A method of updating the monitoring timing is described in detail in the following example 2-2 of the first embodiment.

Subsequently, the UE may monitor a paging occasion/frame related to a paging signal from the system 1 based on the updated monitoring timing, in S1213.

In the same manner, the UE may monitor a paging occasion/frame related to a paging signal from the system 2 based on the updated monitoring timing, in S1215.

Example 2-1 of First Embodiment

The UE may inform the system/network that the UE has a problem in receiving paging (or that a conflict has occurred between paging occasions/frames), using the following method.

The following description is given based on an EPS message, and a similar method may be used in 5GS.

Tracking Area Update Request

Message Definition

The effects/purposes of sending, by the UE, an update request for a tracking area (or occasion/frame) for tracking a paging signal to the system/network are described in subclause 5.5.3.1 of the standard document, and the detailed description is given in the following Table 6. The following values are merely an example, and the present disclosure is not limited thereto.

Message type: TRACKING AREA UPDATE REQUEST
Significance: Dual
Direction: UE to network

TABLE 6

| IEI | Information Element | Type/Reference | Presence | Format | Length |
|---|---|---|---|---|---|
|  | Protocol discriminator | Protocol discriminator/9.2 | M | V | 1/2 |
|  | Security header type | Security header type/9.3.1 | M | V | 1/2 |
|  | Tracking area update request message identity | Message type/9.8 | M | V | 1 |
|  | EPS update type | EPS update type/9.9.3.14 | M | V | 1/2 |
|  | NAS key set identifier | NAS key set identifier/9.9.3.21 | M | V | 1/2 |
|  | Old GUTI | EPS mobile identity/9.9.3.12 | M | LV | 12 |
| B- | Non-current native NAS key set identifier | NAS key set identifier/9.9.3.21 | O | TV | 1 |
| 8- | GPRS ciphering key sequence number | Ciphering key sequence number/9.9.3.4a | O | TV | 1 |
| 19 | Old P-TMSI signature | P-TMSI signature/9.9.3.26 | O | TV | 4 |
| 50 | Additional GUTI | EPS mobile identity/9.9.3.12 | O | TLV | 13 |
| 55 | Nonce UE | Nonce/9.9.3.25 | O | TV | 5 |
| 58 | UE network capability | UE network capability/9.9.3.24 | O | TLV | 4-15 |
| 52 | Last visited registered TAI | Tracking area identity/9.9.3.32 | O | TV | 6 |
| 5C | DRX parameter | DRX parameter/9.9.3.8 | O | TV | 3 |
| A- | UE radio capability information update needed | UE radio capability information update needed/9.9.3.35 | O | TV | 1 |
| 57 | EPS bearer context status | EPS bearer context status/9.9.2.1 | O | TLV | 4 |
| 31 | MS network capability | MS network capability/9.9.3.20 | O | TLV | 4-10 |
| 13 | Old location/area identification | Location/area identification/9.9.2.2 | O | TV | 6 |
| 9- | TMSI status | TMSI status/9.9.3.31 | O | TV | 1 |
| 11 | MS classmark 2 | MS classmark 2/9.9.2.4 | O | TLV | 5 |
| 20 | MS classmark 3 | MS classmark 3/9.9.2.5 | O | TLV | 2-34 |
| 40 | Supported Codecs | Supported Codec List/9.9.2.10 | O | TLV | 5-n |
| F- | Additional update type | Additional update type/9.9.3.0B | O | TV | 1 |

TABLE 6-continued

| IEI | Information Element | Type/Reference | Presence | Format | Length |
|---|---|---|---|---|---|
| 5D | Voice domain preference and UE's usage setting | Voice domain preference and UE's usage setting/9.9.3.44 | O | TLV | 3 |
| E- | Old GUTI type | GUTI type/9.9.3.45 | O | TV | 1 |
| D- | Device properties | Device properties/9.9.2.0A | O | TV | 1 |
| C- | MS network feature support | MS network feature support/9.9.3.20A | O | TV | 1 |
| 10 | TMSI based NRI container | Network resource identifier container/9.9.3.24A | O | TLV | 4 |
| 6A | T3324 value | GPRS timer 2/9.9.3.16 | O | TLV | 3 |
| 5E | T3412 extended value | GPRS timer 3/9.9.3.16B | O | TLV | 3 |
| 6E | Extended DRX parameters | Extended DRX parameters/9.9.3.46 | O | TLV | 3 |
| 6F | UE additional security capability | UE additional security capability/9.9.3.53 | O | TLV | 6 |
| 6D | UE status | UE status/9.9.3.54 | O | TLV | 3 |
| 17 | Additional information requested | Additional information requested/9.9.3.55 | O | TV | 2 |
| XX | Paging Conflict | Paging Conflict Information | O | X | x |

Paging Conflict

The paging conflict information element may include whether the UE cannot receive a current paging occasion, or whether the UE has requested a new parameter to be used for the paging reception.

That is, the UE may request the system/network to allocate a new parameter for paging using an additional field to a TAU message or other message.

In the above process, instead of using a separate field, the UE may request the allocation of a new parameter for paging using the existing field. For example, as below, the UE may additionally indicate an issue related to a paging conflict in an update type information field. The following values are merely an example, and the present disclosure is not limited thereto.

EPS Update Type

The purpose of the EPS update type information element is to specify an area associated with an update procedure. That is, the UE may specify the area associated with an update procedure by reporting the EPS update type information element to the network/system.

The EPS update type information element is coded as shown in FIG. 18 and FIG. 19. The EPS update type is a type 1 information element. The following values are merely an example, and the present disclosure is not limited thereto.

For example, as a response to this, the network may use the following 'Tracking Area Update Accept' message.

Tracking Area Update Accept (Message)

Message Definition

The tracking area update accept message is sent to the UE by the network to provide the UE with EPS mobility management related data in response to a tracking area update request message that is sent to the system/network by the UE. The detailed description is given in the following Table 7. The following values are merely an example, and the present disclosure is not limited thereto.

Message type: TRACKING AREA UPDATE ACCEPT
Significance: Dual
Direction: network to UE

TABLE 7

| IEI | Information Element | Type/Reference | Presence | Format | Length |
|---|---|---|---|---|---|
| | Protocol discriminator | Protocol discriminator/9.2 | M | V | 1/2 |
| | Security header type | Security header type/9.3.1 | M | V | 1/2 |
| | Tracking area update accept message identity | Message type/9.8 | M | V | 1 |
| | EPS update result | EPS update result/9.9.3.13 | M | V | 1/2 |
| | Spare half octet | Spare half octet/9.9.2.9 | M | V | 1/2 |
| 5A | T3412 value | GPRS timer/9.9.3.16 | O | TV | 2 |
| 50 | GUTI | EPS mobile identity/9.9.3.12 | O | TLV | 13 |
| 54 | TAI list | Tracking area identity list/9.9.3.33 | O | TLV | 8-98 |
| 57 | EPS bearer context status | EPS bearer context status/9.9.2.1 | O | TLV | 4 |
| 13 | Location/area identification | Location/area identification/9.9.2.2 | O | TV | 6 |
| 23 | MS identity | Mobile identity/9.9.2.3 | O | TLV | 7-10 |
| 53 | EMM cause | EMM cause/9.9.3.9 | O | TV | 2 |
| 17 | T3402 value | GPRS timer/9.9.3.16 | O | TV | 2 |
| 59 | T3423 value | GPRS timer/9.9.3.16 | O | TV | 2 |
| 4A | Equivalent PLMNs | PLMN list/9.9.2.8 | O | TLV | 5-47 |
| 34 | Emergency number list | Emergency number list/9.9.3.37 | O | TLV | 5-50 |
| 64 | EPS network feature support | EPS network feature support/9.9.3.12A | O | TLV | 3-4 |
| F- | Additional update result | Additional update result/9.9.3.0A | O | TV | 1 |

TABLE 7-continued

| IEI | Information Element | Type/Reference | Presence | Format | Length |
|---|---|---|---|---|---|
| 5E | T3412 extended value | GPRS timer 3/9.9.3.16B | O | TLV | 3 |
| 6A | T3324 value | GPRS timer 2/9.9.3.16A | O | TLV | 3 |
| 6E | Extended DRX parameters | Extended DRX parameters/ 9.9.3.46 | O | TLV | 3 |
| 68 | Header compression configuration status | Header compression configuration status/ 9.9.4.27 | O | TLV | 4 |
| 65 | DCN-ID | DCN-ID/9.9.3.48 | O | TLV | 4 |
| E- | SMS services status | SMS services status/ 9.9.3.4B | O | TV | 1 |
| D- | Non-3GPP NW policies | Non-3GPP NW provided/ 9.9.3.49 | O | TV | 1 |
| 6B | T3448 value | GPRS timer 2/9.9.3.16A | O | TLV | 3 |
| C- | Network policy | Network policy/9.9.3.52 | O | TV | 1 |
| 6C | T3447 value | GPRS timer 3/9.9.3.16B | O | TLV | 3 |
| 7A | Extended emergency number list | Extended emergency number list/9.9.3.37A | O | TLV-E | 6-65538 |
| 7C | Ciphering key data | Ciphering key data/9.9.3.56 | O | TLV-E | 35-2291 |
| XX | Paging Parameter | Paging Parameter | | | |

Paging Parameter

The paging parameter information element indicates a parameter that the UE should use for reception of the paging signal from the network/system. For example, P-IMSI value may be allocated by the paging parameter message. However, this is merely an example, and the present disclosure is not limited thereto.

Example 2-2 of First Embodiment

When the UE receives a new parameter for paging from the network, the UE may perform the following process. On the assumption that the UE receives P-IMSI from the network, a discontinuous reception method for paging is described below.

Discontinuous Reception for Paging

The UE may use discontinuous reception (DRX) in an idle mode in order to reduce power consumption. One paging occasion (PO) is a subframe where there may be P-RNTI transmitted on MPDCCH or for NB-IoT on NPDCCH addressing a paging message. In the P-RNTI transmitted on the MPDCCH case, the PO refers to a starting subframe of MPDCCH repetitions. In case of the P-RNTI transmitted on the NPDCCH, the PO refers to a starting subframe of NPDCCH repetitions unless a subframe determined by the PO is not a valid NB-IoT downlink subframe. Then, a first valid NB-IoT downlink subframe after the PO is a starting subframe of the NPDCCH repetitions. The paging message is same for both RAN initiated paging and CN initiated paging.

The UE initiates an RRC Connection Resume procedure upon receiving RAN paging. If the UE receives a CN initiated paging in an RRC_INACTIVE state, the UE moves to RRC_IDLE and informs NAS of the corresponding information.

One paging frame (PF) is one radio frame, which may contain one or multiple paging occasion(s). When the DRX is used, the UE monitors only one PO per DRX cycle.

One paging narrowband (PNB) is one narrowband on which the UE performs the paging message reception.

The PF, the PO, and the PNB are determined by following method using DRX parameters provided in system information (SI).

The PF is determined by the following Equation 7.

$$\text{SFN mod } T = (T \text{ div } N)*(UE\_ID \text{ mod } N) \quad \text{[Equation 7]}$$

An index i_s pointing to the PO from a subframe pattern defined in section 7.2 of the standard document is determined by the following Equation 8.

$$i\_s = \text{floor}(UE\_ID/N) \text{ mod } Ns \quad \text{[Equation 8]}$$

If the P-RNTI is monitored (detected) on the MPDCCH, the PNB is determined by the following Equation 9.

$$PNB = \text{floor}(UE\_ID/(N*Ns)) \text{ mod } Nn \quad \text{[Equation 9]}$$

If the P-RNTI is monitored on the NPDCCH and the UE supports paging on a non-anchor carrier, and if paging configuration for non-anchor carrier is provided in system information, then the paging carrier is determined by the paging carrier with smallest index n (0≤n≤Nn−1) fulfilling the following Equation 10.

$$\text{floor}(UE\_ID/(N*Ns)) \text{ mod } W < W(0) + W(1) + \ldots + W(n) \quad \text{[Equation 10]}$$

System information DRX parameters stored in the UE shall be updated restrictively in the UE regardless of whether the DRX parameter values are changed in SI. If the UE has no IMSI, for example, when making an emergency call without USIM, the UE uses as default identity UE_ID=0 in the PF, i_s, and PNB formulas above.

The following parameters are used for the calculation of the PF, i_s, PNB, and the NB-IoT paging carrier:

- T: DRX cycle of the UE. Except for NB-IoT, if a UE specific extended DRX value of 512 radio frames is configured by upper layers according to section 7.3 of the standard document, T is 512. Otherwise, T is determined by the shortest value of the UE specific DRX value, if allocated by upper layers, and a default DRX value broadcasted in system information. If UE specific DRX is not configured by upper layers, the default value is applied. The UE specific DRX is not applicable for NB-IoT. In the RRC_INACTIVE state, T is determined by the shortest of the RAN paging cycle, the UE specific paging cycle, and the default paging cycle, if allocated by upper layers.
- nB: 4T, 2T, T, T/2, T/4, T/8, T/16, T/32, T/64, T/128, and T/256, and for NB-IoT also T/512, and T/1024.
- N: minimum value of T and nB
- Ns: maximum value of 1 and nB/T
- Nn: number of paging narrowbands (for P-RNTI monitored on MPDCCH) or paging carriers (for P-RNTI monitored on NPDCCH) provided in system information UE_ID is determined as follows:
If P-IMSI is not received from a network:
  IMSI mod 1024, if P-RNTI is monitored on PDCCH.
  IMSI mod 4096, if P-RNTI is monitored on NPDCCH.
  IMSI mod 16384, if P-RNTI is monitored on MPDCCH or if P-RNTI is monitored on NPDCCH and the UE supports paging on a non-anchor carrier, and if paging configuration for non-anchor carrier is provided in system information.
Else if valid P-IMSI is received from a network:
  P-IMSI mod 1024, if P-RNTI is monitored on PDCCH.
  P-IMSI mod 4096, if P-RNTI is monitored on NPDCCH.
  P-IMSI mod 16384, if P-RNTI is monitored on MPDCCH or if P-RNTI is monitored on NPDCCH and the UE supports paging on a non-anchor carrier, and if paging configuration for non-anchor carrier is provided in system information.
W(i): Weight for NB-IoT paging carrier i.
W: Total weight of all NB-IoT paging carriers (e.g., W=W(0)+W(1)+ . . . +W(Nn−1).
IMSI is given as sequence of digits of type Integer (0, . . . , 9).
IMSI in the equation above is interpreted as a decimal integer number, where the first digit given in the sequence represents the highest order digit.
For example, IMSI is given as IMSI=12 (digit1=1, digit2=2), and this shall be interpreted as the decimal integer "12", not "1×16+2=18".
Subframe Patterns
FDD
If P-RNTI is transmitted on PDCCH or NPDCCH, or if P-RNTI is transmitted on MPDCCH with system bandwidth >3 MHz, the PO is determined as the following Table 8.

TABLE 8

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

If P-RNTI is transmitted on MPDCCH with system bandwidth of 1.4 MHz and 3 MHz, the PO is determined as the following Table 9.

TABLE 9

| Ns | PO when i_s = 0 | PO when i_s = 1 | PO when i_s = 2 | PO when i_s = 3 |
|---|---|---|---|---|
| 1 | 5 | N/A | N/A | N/A |
| 2 | 5 | 5 | N/A | N/A |
| 4 | 5 | 5 | 5 | 5 |

TDD (all UL/DL configurations): —If P-RNTI is transmitted on PDCCH or NPDCCH, or if P-RNTI is transmitted on MPDCCH with system bandwidth >3 MHz, the PO is determined as the following Table 10.

TABLE 10

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

If P-RNTI is transmitted on MPDCCH with system bandwidth of 1.4 MHz and 3 MHz, the PO is determined as the following Table 11.

TABLE 11

| Ns | PO when i_s = 0 | PO when i_s = 1 | PO when i_s = 2 | PO when i_s = 3 |
|---|---|---|---|---|
| 1 | 1 | N/A | N/A | N/A |
| 2 | 1 | 6 | N/A | N/A |
| 4 | 1 | 1 | 6 | 6 |

Example 3 of First Embodiment

In the above examples 1 and 2, there may be configuration of the network/services or the operator according to the related art that does not provide a function related to the update of paging signal timing. There may also be a network that does not support the UE with a plurality of SIM cards.

Accordingly, in order to prevent the UE from imprudently requesting a paging related update, only if the UE receives, from the network/system, an indicator or an indication supporting a change (or update) of a paging signal timing (or paging parameter), the UE may send the update request.

In order to perform the above method, the network/system may transmit, to the UE, an indicator or an indication supporting a change (or update) of a paging signal timing (or paging parameter) using a system information block. As another example, the network/system may indicate, to the UE, whether to support an update function of a paging signal timing (or paging parameter or paging occasion/frame) in a registration step of the UE.

In addition, only if the UE receives, from the network/system, an indication of whether to support a paging related update function as above, the UE may send the update request to the network/system as above. In other words, in the example 2 of the first embodiment, if the UE checks a conflict of paging occasions/frames from two networks/systems, the UE may check whether the networks/systems support an update function of the paging occasions/frames, and then may send the update request only when the update is supported in at least one of the two networks/systems.

Second Embodiment

In a second embodiment, a UE first performs registration only to a first network/system of a plurality of networks/systems.

Next, when the UE registers with a second network/system, the UE may transmit, to the second network/system, information related to a paging signal timing used for transmission of a paging signal in the first network/system.

Subsequently, the second network/system may transmit, to the UE, information on a paging signal timing for avoiding a conflict with the paging signal of the first network/system.

Third Embodiment

In the first embodiment and the second embodiment, it is assumed that UE's behaviors are in the idle state. Unlike these embodiments, in a third embodiment, in a situation where the UE transmits and receives data from one network/system, the UE may additionally receive an indication of whether there is a paging signal to be transmitted to the UE in another system.

Fourth Embodiment

In a fourth embodiment, a UE may transmit and receive different data from a first network/system and a second network/system at the same time. For example, the UE may perform a voice call via the first network/system and perform data communication via the second network/system.

Main Embodiments of the Present Disclosure

FIG. 13 is a flow chart illustrating a method for a UE to receive paging signals from networks in accordance with an embodiment of the present disclosure.

As illustrated in FIG. 13, first, when there is a conflict between paging signals received from a plurality of networks, a UE may report, to a first network, information related to a conflict occasion, in S1301.

Subsequently, the UE may receive, from the first network, updated paging signal timing information, S1303.

Finally, the UE may monitor the paging signals from the plurality of networks based on the updated paging signal timing information, S1305.

FIG. 14 is a flow chart illustrating a method for networks to transmit paging signals to a UE in accordance with an embodiment of the present disclosure.

As illustrated in FIG. 14, first, when there is a conflict between paging signals from a plurality of networks in one UE, the network may receive, from the UE, information related to a conflict occasion, in S1401.

Subsequently, the network may transmit, to the UE, updated paging signal timing information, S1403.

Finally, the network may transmit, to the UE, the paging signal based on the updated paging signal timing information.

Overview of Device to which the Present Disclosure is Applicable

FIG. 15 illustrates a configuration block diagram of a communication device according to an embodiment of the present disclosure.

Referring to FIG. 15, a wireless communication system includes a network node 1510 and a plurality of UEs 1520.

The network node 1510 includes a processor 1511, a memory 1512, and a communication module (or transceiver) 1513. The processor 1511 may implement functions, processes, and/or methods described above with reference to FIGS. 1 to 14. Layers of wired/wireless interface protocol may be implemented by the processor 1511.

The memory 1512 is connected to the processor 1511 and stores various types of information for driving the processor 1511. The communication module 1513 is connected to the processor 1511 and transmits and/or receives wired/wireless signals. Examples of the network node 1510 may include a base station, AMF, SMF, UDF, or the like. In particular, if the network node 1510 is the base station, the communication module 1513 may include a radio frequency (RF) unit for transmitting/receiving a radio signal.

The UE 1520 includes a processor 1521, a memory 1522, and a communication module (or RF unit) (or transceiver) 1523. The processor 1521 may implement functions, processes and/or methods described above with reference to FIGS. 1 to 14. Layers of a radio interface protocol may be implemented by the processor 1521. In particular, the processor 1521 may include the NAS layer and the AS layer. The memory 1522 is connected to the processor 1521 and stores various types of information for driving the processor 1521. The communication module 1523 is connected to the processor 1521 and transmits and/or receives a radio signal.

The memories 1512 and 1522 may be inside or outside the processors 1511 and 1521 and may be connected to the processors 1511 and 1521 through various well-known means. Further, the network node 1510 (in case of the base station) and/or the UE 1520 may have a single antenna or multiple antennas.

FIG. 16 illustrates a configuration block diagram of a communication device according to an embodiment of the present disclosure.

In particular, FIG. 16 illustrates in more detail the UE illustrated in FIG. 15. The communication module illustrated in FIG. 15 includes an RF module (or RF unit) illustrated in FIG. 16. The processor illustrated in FIG. 15 corresponds to a processor (or a digital signal processor (DSP) 1610) in FIG. 16. The memory illustrated in FIG. 15 corresponds to a memory 1630 illustrated in FIG. 16.

Referring to FIG. 16, the UE may include a processor (or digital signal processor (DSP)) 1610, an RF module (or RF unit) 1635, a power management module 1605, an antenna 1640, a battery 1655, a display 1615, a keypad 1620, a memory 1630, a subscriber identification module (SIM) card 1625 (which is optional), a speaker 1645, and a microphone 1650. The UE may also include a single antenna or multiple antennas.

The processor 1610 implements functions, processes, and/or methods described above. Layers of a radio interface protocol may be implemented by the processor 1610.

The memory 1630 is connected to the processor 1610 and stores information related to operations of the processor 1610. The memory 1630 may be inside or outside the processor 1610 and may be connected to the processors 1610 through various well-known means.

A user inputs instructional information, such as a telephone number, for example, by pushing (or touching) buttons of the keypad 1620 or by voice activation using the microphone 1650. The processor 1610 receives and processes the instructional information to perform an appropriate function, such as to dial the telephone number. Operational data may be extracted from the SIM card 1625 or the memory 1630. Further, the processor 1610 may display instructional information or operational information on the display 1615 for the user's reference and convenience.

The RF module 1635 is connected to the processor 1610 and transmits and/or receives an RF signal. The processor 1610 forwards instructional information to the RF module 1635 in order to initiate communication, for example, transmit a radio signal configuring voice communication data. The RF module 1635 includes a receiver and a transmitter to receive and transmit the radio signal. The antenna 1640 functions to transmit and receive the radio signal. Upon reception of the radio signal, the RF module 1635 may send a signal to be processed by the processor 1610 and convert the signal into a baseband. The processed signal may be converted into audible or readable information output via the speaker 1645.

FIG. 17 illustrates an example of a structure of a radio interface protocol in a control plane between a UE and eNodeB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based on three lower layers of an open system interconnection (OSI) standard model that is well known in the art of communication systems.

The layers of the radio protocol in the control plane illustrated in FIG. 17 are described below.

The physical layer, the first layer, provides an information transfer service using a physical channel. The physical layer is connected to a medium access control (MAC) layer located at a higher level via a transport channel, and data between the MAC layer and the physical layer is transferred via the transport channel. Data is transferred between different physical layers, i.e., between physical layers of a transmission side and a reception side via the physical channel.

The physical channel consists of several subframes on a time axis and several subcarriers on a frequency axis. One subframe consists of a plurality of symbols and a plurality of subcarriers on the time axis. One subframe consists of a plurality of resource blocks, and one resource block consists of a plurality of symbols and a plurality of subcarriers. A unit time, a transmission time interval (TTI), at which data is transmitted, is 1 ms corresponding to one subframe.

Physical channels existing in the physical layers of the transmission side and the reception side may be divided into, according to 3GPP LTE, a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels.

The PCFICH transmitted on a first OFDM symbol of a subframe carries a control format indicator (CFI) regarding the number of OFDM symbols used for transmission of control channels in the subframe (i.e., size of a control region). A wireless device first receives the CFI on the PCFICH and then monitors the PDCCH.

Unlike the PDCCH, the PCFICH is transmitted via a fixed PCFICH resource of the subframe without the use of blind decoding.

The PHICH carries positive acknowledgement (ACK)/negative acknowledgement (NACK) signal for uplink (UL) hybrid automatic repeat request (HARQ). The ACK/NACK signal for UL data on PUSCH transmitted by the wireless device is transmitted on the PHICH.

A physical broadcast channel (PBCH) is transmitted on first four OFDM symbols of a second slot of a first subframe of a radio frame. The PBCH carries system information essential for the wireless device to communicate with the base station, and system information transmitted on the PBCH is referred to as a master information block (MIB). Compared to this, system information transmitted on the PDSCH indicated by the PDCCH is referred to as a system information block (SIB).

The PDCCH may carry resource allocation and transport format of a downlink shared channel (DL-SCH), resource allocation information of an uplink shared channel (UL-SCH), paging information on a paging channel (PCH), system information on DL-SCH, resource allocation of an upper layer control message such as a random access response transmitted on PDSCH, a set of Tx power control commands on individual UEs within an arbitrary UE group, a Tx power control command, activation of a voice over internet protocol (VoIP), etc. A plurality of PDCCHs can be transmitted within a control region, and the UE can monitor the plurality of PDCCHs. The PDCCH is transmitted on aggregation of one or multiple consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined depending on a correlation between the number of CCEs and the coding rate provided by the CCEs.

Control information transmitted on PDCCH is referred to as downlink control information (DCI). The DCI may contain resource allocation of PDSCH (which is also referred to as DL grant), resource allocation of PUSCH (which is also referred to as UL grant), a set of Tx power control commands on individual UEs within an arbitrary UE group, and/or activation of a voice over internet protocol (VoIP).

There are several layers in the second layer. First, a medium access control (MAC) layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane, according to a type of transmitted information.

The radio link control (RLC) layer of the second layer segments and concatenate data received from the upper layer and adjusts a data size so that a lower layer is adapted to transmit data to a radio section. In order to guarantee various QoS required by each radio bearer (RB), the RLC layer provides three operation modes of a transparent mode (TM), an unacknowledged mode (UM) (non-response mode), and an acknowledged mode (AM) (or response mode). In particular, the AM RLC performs a retransmission function through an automatic repeat and request (ARQ) function for reliable data transmission.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. This allows only information, that is necessarily required in a header part of data, to be transmitted, thereby increasing transmission efficiency of the radio section. In the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC_IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. Examples of the cases may include a case where transmission of uplink data is necessary for a reason of an attempt of a user to make a phone call, etc., or transmission of a response message when receiving a paging signal from the E-UTRAN.

A non-access stratum (NAS) layer performs functions such as session management and mobility management.

The NAS layer illustrated in FIG. 17 is described in detail below.

The NAS layer is divided into a NAS entity for mobility management (MM) and a NAS entity for session management (SM).

1) The NAS entity for MM generally provides the following functions.

An NAS procedure related to the AMF includes the following.
  Registration management and connection management procedure. The AMF supports the functions.
  Secure NAS signal connection between the UE and the AMF (integrity protection, ciphering)

2) The NAS entity for SM performs session management between the UE and the SMF.

A SM signalling message is generated and processed in the UE and the NAS-SM layer of the SMF. The content of the SM signalling message is not interpreted by the AMF.

In case of SM signalling transmission,
  The NAS entity for MM generates security header indicating NAS transmission of SM signalling, and a NAS-MM message deriving a method and location of sending the SM signalling message via additional information for the received NAS-MM.
  Upon reception of SM signalling, the NAS entity for SM performs integrity check of the NAS-MM message, and derives a method and place of deriving the SM signalling message by interpreting additional information.

In FIG. 17, the RRC layer, the RLC layer, the MAC layer, and the PHY layer located below the NAS layer are collectively referred to access stratum (AS) layer.

Application Range of the Present Disclosure

A wireless device in the present disclosure may be a base station, a network node, a transmitter UE, a receiver UE, a radio device, a wireless communication device, a vehicle, a vehicle with a self-driving function, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service, or the like. For example, the drone may be an airborne vehicle that flies by a radio control signal without a person being on the flight vehicle. For example, the MTC device and the IoT device may be a device that does not require a person's direct intervention or manipulation, and may include a smart meter, a vending machine, a thermometer, a smart bulb, a door lock, a variety of sensors, or the like. For example, the medical device may be a device used for the purpose of diagnosing, treating, reducing, handling or preventing a disease and a device used for the purpose of testing, substituting or modifying a structure or function, and may include a device for medical treatment, a device for operation, a device for (external) diagnosis, a hearing aid, or a device for a surgical procedure, or the like. For example, the security device may be a device installed to prevent a possible danger and to maintain safety, and may include a camera, CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

Mobile terminals disclosed in the present disclosure may include cellular phones, smart phones, laptop computers, digital broadcast terminals, personal digital assistants (PDAs), portable multimedia players (PMPs), navigators, slate PCs, tablet PCs, ultra-books, wearable devices (e.g., smart watches, smart glasses, head mounted displays (HMDs)), and the like. Furthermore, the mobile terminals may be used for controlling at least one device in an Internet of Things (IoT) environment or a smart greenhouse.

By way of non-limiting example only, further description will be made with reference to particular types of mobile terminals. However, such teachings may be equally applied to other types of mobile terminals, such as those types noted above. In addition, it can be readily apparent to those skilled in the art that these teachings can also be applied to stationary terminals such as digital TV, desktop computers, digital signage, and the like.

Hereinafter, embodiments related to a control method which can be implemented by the mobile terminal configured as above were described with reference to the accompanying drawings. It is apparent to those skilled in the art that various modifications can be made to within the range without departing from the spirit and essential features of the present invention.

The embodiments of the present disclosure described above can be implemented by various means. For example, embodiments of the present disclosure can be implemented by hardware, firmware, software, or combinations thereof.

When embodiments are implemented by hardware, a method according to embodiments of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, a method according to embodiments of the present disclosure can be implemented by devices, procedures, functions, etc. performing functions or operations described above. Software code can be stored in a memory unit and can be executed by a processor. The memory unit is provided inside or outside the processor and can exchange data with the processor by various well-known means.

The present disclosure described above can be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, and an optical data storage device, other types of storage mediums presented herein, etc. If desired, the computer-readable medium may be implemented in the form of a carrier wave (e.g., transmission over Internet). The computer may include the processor of the terminal. Accordingly, the detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

INDUSTRIAL APPLICABILITY

The communication method described above can be applied to various wireless communication systems including IEEE 802.16x and 802.11x systems, in addition to the 3GPP system. Furthermore, the proposed method can be applied to the mmWave communication system using ultra-high frequency bands.

The invention claimed is:

1. A method of receiving, by a user equipment (UE) supporting a multi-universal subscriber identity module (USIM), a paging signal in a wireless communication system, the method comprising:
   registering with a plurality of networks;
   obtaining a plurality of paging occasions;
   checking whether a paging message is received from each of the plurality of networks;
   determining that a first paging occasion and a second paging occasion of the plurality of paging occasions overlap;
   transmitting, to a first network, a tracking area update (TAU) request message including information related to an original international mobile subscriber identity (IMSI) of the first paging occasion;
   receiving, from the first network, a TAU accept message including an alternative IMSI for changing the first paging occasion; and
   updating the first paging occasion based on the alternative IMSI.

2. The method of claim 1, further comprising:
   determining a network supporting an update of a paging occasion among the plurality of networks,
   wherein the requesting comprises, when the first network is determined as the network supporting the update of the monitoring time point, requesting the first network to update the first paging occasion.

3. The method of claim 2, wherein the requesting comprises requesting the first network to update the first paging occasion, when receiving, from the first network, information that the first network supports the update of the first paging occasion.

4. A user equipment (UE) receiving a paging signal from a plurality of networks in a wireless communication system, the UE supporting a multi-universal subscriber identity module (USIM) comprising:
   a radio frequency (RF) module configured to transmit and receive a radio signal;
   at least one processor functionally connected to the RF module; and
   at least one computer memory operationally connected to the at least one processor,
   wherein the at least one computer memory is configured to store, upon execution, instructions that allow the at least one processor to:
   register with the plurality of networks;
   obtain a plurality of paging occasions;
   check whether a paging message is received from each of the plurality of networks;
   determine that a first paging occasion and a second paging occasion of the plurality of paging occasions overlap;
   transmit, to a first network, tracking area update (TAU) request message including information related to an original international mobile subscriber identity (IMSI) of the first paging occasion;
   receive, from the first network, a TAU accept message including an alternative IMSI for changing the first paging occasion; and
   update the first paging occasion based on the alternative IMSI.

5. The UE of claim 2,
   wherein the at least one processor is configured to determine a network supporting an update of a paging occasion among the plurality of networks,
   wherein the at least one processor is further configured to, when the first network is determined as the network supporting the update of the monitoring time point, request the first network to update the first paging occasion.

6. The UE of claim 5, wherein the at least one processor is further configured to request the first network to update the first paging occasion, when receiving, from the first network, information that the first network supports the update of the first paging occasion.

* * * * *